(12) United States Patent
Teller

(10) Patent No.: US 7,768,396 B2
(45) Date of Patent: Aug. 3, 2010

(54) MONITORING BEVERAGE DISPENSING USING POUR EVENT DATA AND RING UP DATA

(75) Inventor: David Teller, Mill Valley, CA (US)

(73) Assignee: Beverage Metrics Holding Ltd, Baar (CH)

( * ) Notice: Subject to any disclaimer, the term of this patent is extended or adjusted under 35 U.S.C. 154(b) by 0 days.

(21) Appl. No.: 11/870,253

(22) Filed: Oct. 10, 2007

(65) Prior Publication Data

US 2008/0147211 A1    Jun. 19, 2008

Related U.S. Application Data

(60) Continuation-in-part of application No. 10/990,544, filed on Nov. 18, 2004, which is a division of application No. 10/243,545, filed on Sep. 16, 2002, now Pat. No. 7,196,624, which is a continuation of application No. 09/733,719, filed on Dec. 8, 2000, now Pat. No. 6,504,481.

(60) Provisional application No. 60/850,261, filed on Oct. 10, 2006, provisional application No. 60/169,918, filed on Dec. 10, 1999.

(51) Int. Cl.
*G08B 21/00* (2006.01)
(52) U.S. Cl. .................. 340/540; 340/568.7; 340/545.6
(58) Field of Classification Search .................. 340/540, 340/545.6, 568.7, 568.8, 569, 570; 222/1, 222/640, 639, 638, 641, 23, 36–37; 99/275, 99/300; 62/457.4
See application file for complete search history.

(56) References Cited

U.S. PATENT DOCUMENTS

| | | | |
|---|---|---|---|
| 3,170,597 | A | 2/1965 | Reichenberger |
| 3,706,176 | A | 12/1972 | Leatherman |
| 3,920,149 | A | 11/1975 | Fortino et al. |
| 4,158,624 | A | 6/1979 | Ford et al. |
| 4,168,410 | A | 9/1979 | Norris |
| 4,278,186 | A | 7/1981 | Williamson |
| 4,409,649 | A | 10/1983 | Heeger |
| 4,419,016 | A | 12/1983 | Zoltan |
| 4,433,795 | A | 2/1984 | Maiefski et al. |
| 4,494,656 | A | 1/1985 | Shay et al. |
| 4,660,742 | A | 4/1987 | Ozdemir |
| 4,695,954 | A | 9/1987 | Rose et al. |
| 4,736,871 | A | 4/1988 | Luciani et al. |
| 4,884,212 | A | 11/1989 | Stutsman |

(Continued)

FOREIGN PATENT DOCUMENTS

| | | | |
|---|---|---|---|
| WO | 8101506 | A1 | 6/1981 |
| WO | 9636950 | A1 | 11/1996 |

*Primary Examiner*—Daniel Previl
(74) *Attorney, Agent, or Firm*—Katten Muchin Rosenman LLP

(57) ABSTRACT

A system and method for monitoring beverage dispensing from a container. Independently obtained data from a pour event and ring up are matched using a recipe database. The method involves receiving ring up data for a transaction of the beverage dispensing, determining one or more beverage brands from a selected drink recipe using the ring up data and matching the ring up data with at least one of a plurality of pour event data entries using the determined one or more beverage brands, wherein each of the plurality of pour event data entries is obtained independently of the ring up data.

19 Claims, 21 Drawing Sheets

U.S. PATENT DOCUMENTS

| | | | |
|---|---|---|---|
| 4,944,337 A | 7/1990 | Credle, Jr. et al. | |
| 4,961,533 A * | 10/1990 | Teller et al. | 177/25.19 |
| 4,970,811 A | 11/1990 | Chang | |
| 4,978,946 A | 12/1990 | Nordholm et al. | |
| 5,042,686 A | 8/1991 | Stucki | |
| 5,044,521 A | 9/1991 | Peckels | |
| 5,053,607 A | 10/1991 | Carlson et al. | |
| 5,091,713 A | 2/1992 | Horne et al. | |
| 5,115,888 A | 5/1992 | Scheider | |
| 5,158,793 A | 10/1992 | Helbing | |
| 5,255,819 A * | 10/1993 | Peckels | 222/1 |
| 5,318,197 A | 6/1994 | Martindale et al. | |
| 5,350,082 A * | 9/1994 | Kiriakides et al. | 221/1 |
| 5,372,054 A | 12/1994 | Federighi, Sr. | |
| 5,379,916 A * | 1/1995 | Martindale et al. | 222/1 |
| 5,505,349 A | 4/1996 | Peckels | |
| 5,557,529 A | 9/1996 | Warn et al. | |
| 5,566,732 A | 10/1996 | Nelson | |
| 5,603,430 A * | 2/1997 | Loehrke et al. | 222/1 |
| 5,663,887 A | 9/1997 | Warn et al. | |
| 5,722,526 A | 3/1998 | Sharrard | |
| 5,767,775 A | 6/1998 | Shukla et al. | |
| 5,826,409 A | 10/1998 | Slepicka et al. | |
| 5,831,861 A | 11/1998 | Warn et al. | |
| 5,854,994 A | 12/1998 | Canada et al. | |
| 5,884,292 A | 3/1999 | Baker et al. | |
| 5,889,676 A | 3/1999 | Kubo et al. | |
| 5,930,146 A | 7/1999 | Takenaka | |
| 5,930,766 A | 7/1999 | Gibb | |
| 5,952,218 A | 9/1999 | Lee et al. | |
| 5,969,606 A | 10/1999 | Reber et al. | |
| 6,036,055 A * | 3/2000 | Mogadam et al. | 222/23 |
| 6,053,359 A | 4/2000 | Goulet et al. | |
| 6,056,108 A | 5/2000 | Buchi et al. | |
| 6,056,194 A | 5/2000 | Kolls | |
| 6,101,452 A | 8/2000 | Krall et al. | |
| 6,105,806 A | 8/2000 | Stasiuk | |
| 6,150,942 A | 11/2000 | O'Brian | |
| 6,321,620 B1 | 11/2001 | Fabbro | |
| 6,448,549 B1 | 9/2002 | Safaee-Rad | |
| 6,564,121 B1 | 5/2003 | Wallace et al. | |
| 6,606,605 B1 | 8/2003 | Kolls | |
| 6,718,311 B1 * | 4/2004 | Suo-Anttila | 705/28 |
| 6,854,642 B2 | 2/2005 | Metcalf et al. | |
| 7,126,749 B2 | 10/2006 | Heim et al. | |
| 2002/0087413 A1 | 7/2002 | Mahaffy et al. | |
| 2002/0107610 A1 | 8/2002 | Kaehler et al. | |
| 2003/0055589 A1 | 3/2003 | Mogadam et al. | |
| 2003/0057226 A1 | 3/2003 | Long | |
| 2005/0151625 A1 | 7/2005 | Lai | |
| 2005/0195081 A1 | 9/2005 | Studnicki et al. | |

\* cited by examiner

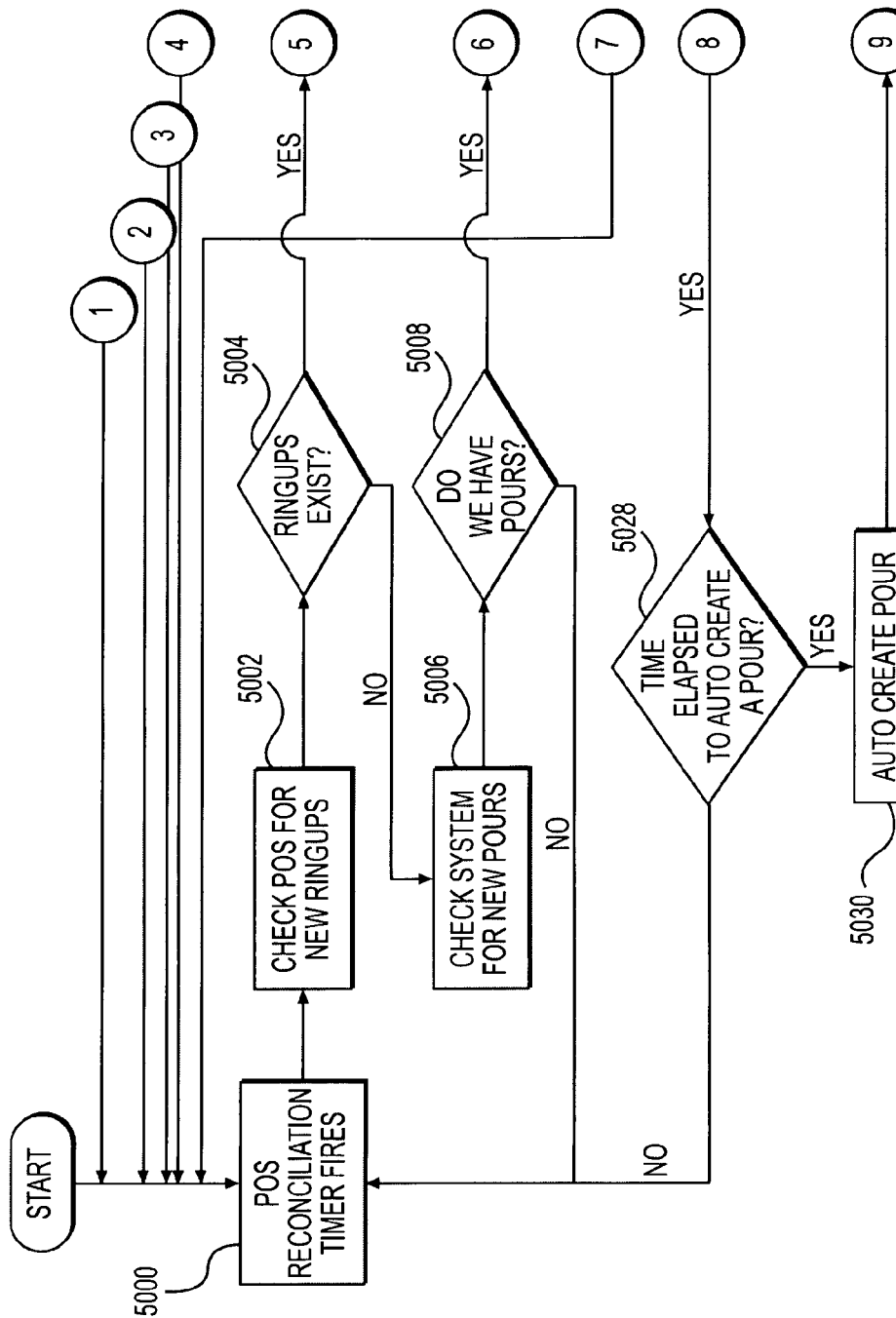
FIG. 10A1

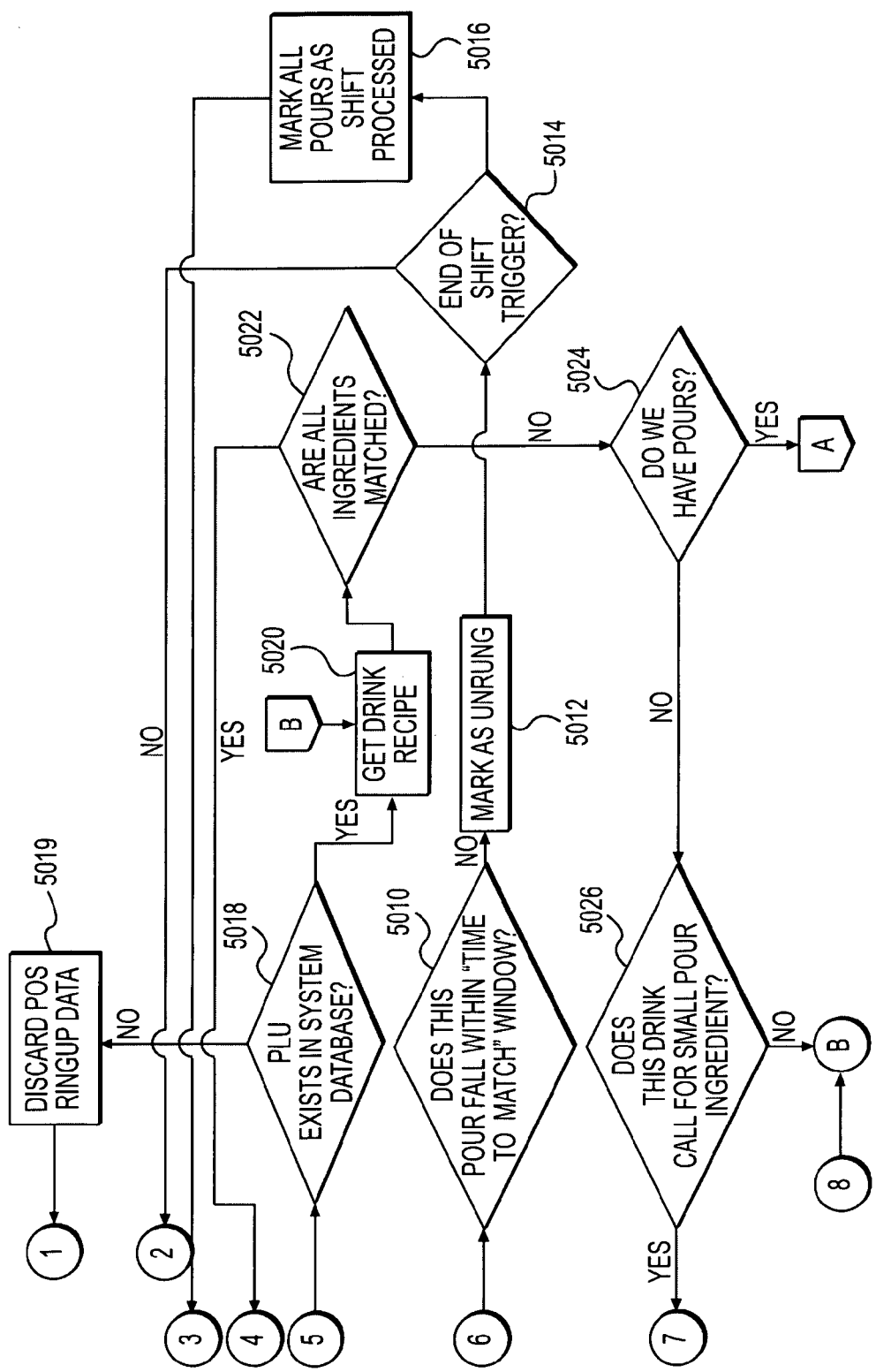
FIG. 10A2

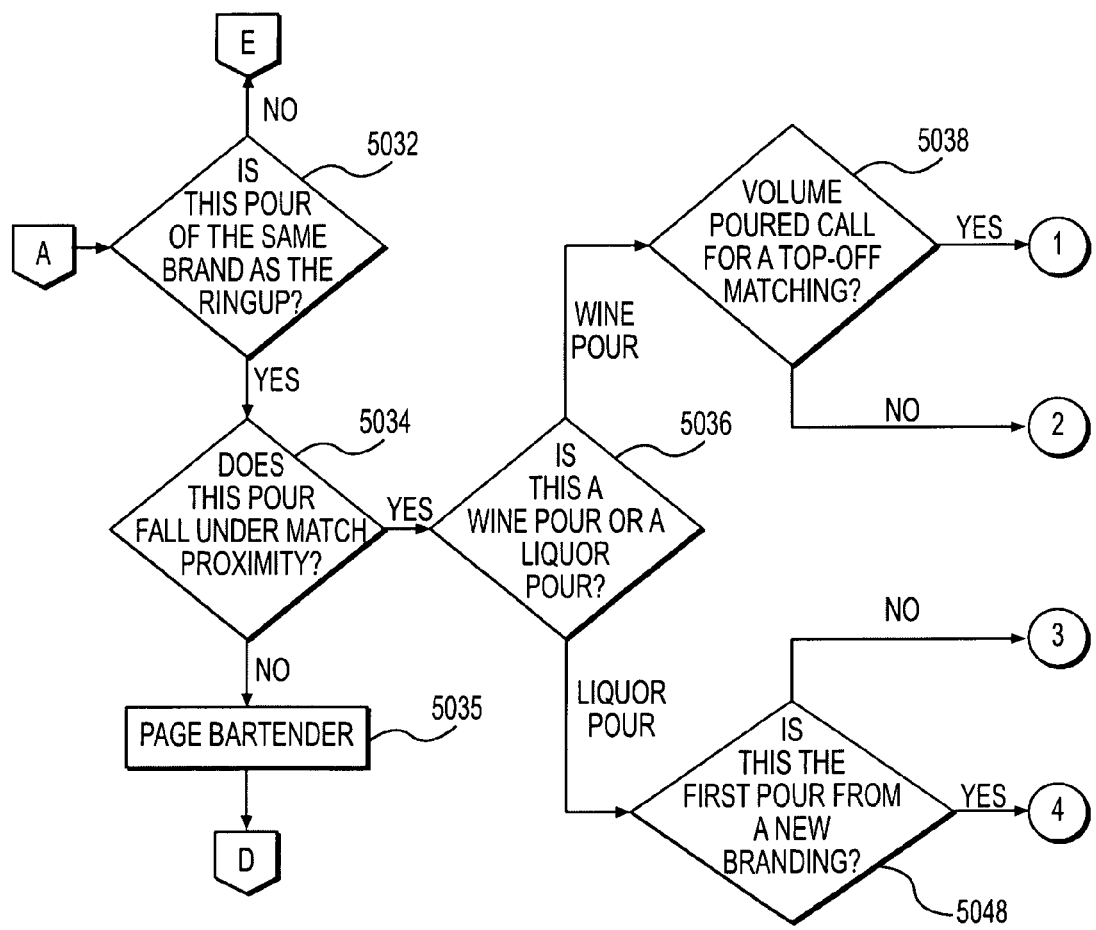
FIG. 10B1

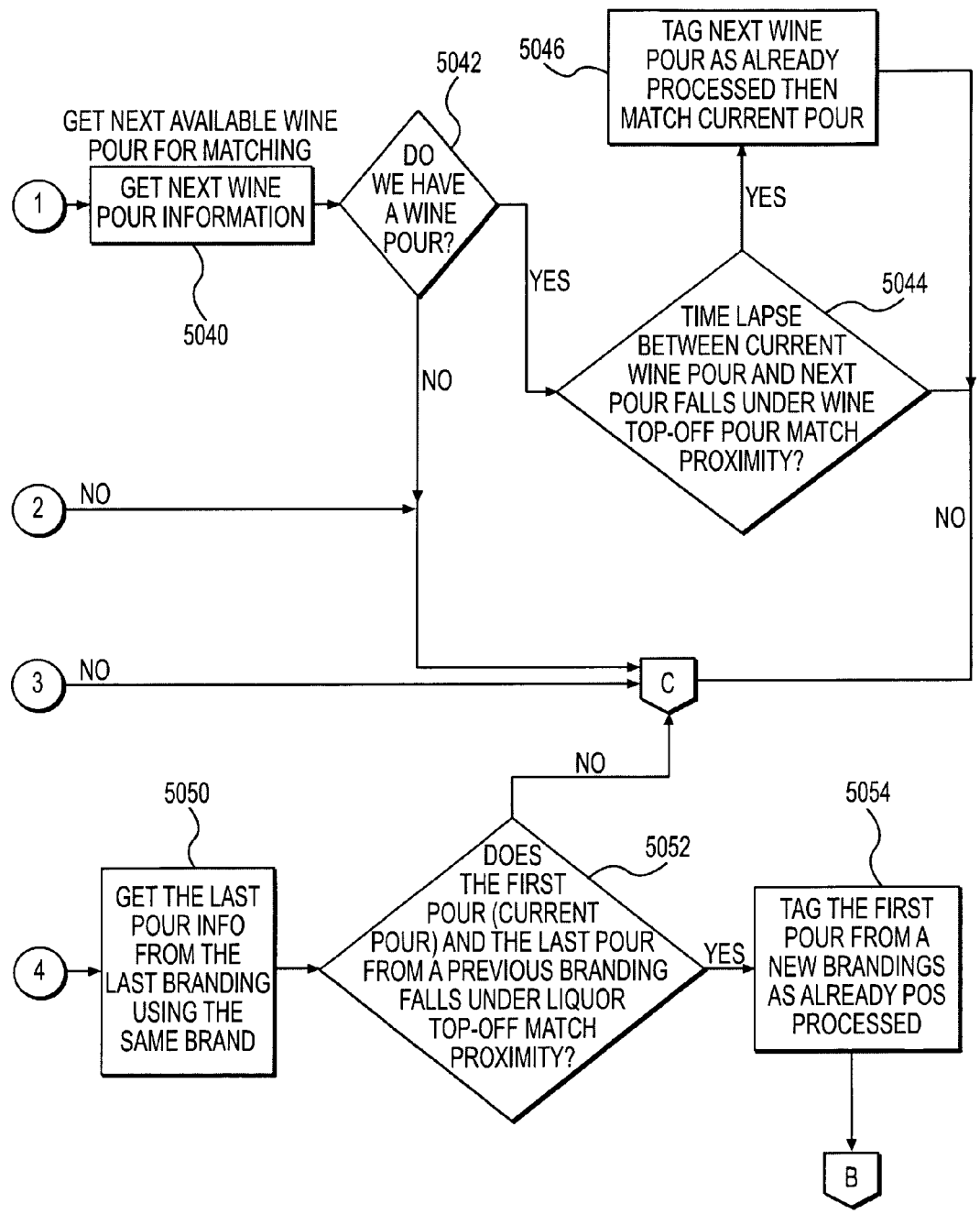
FIG. 10B2

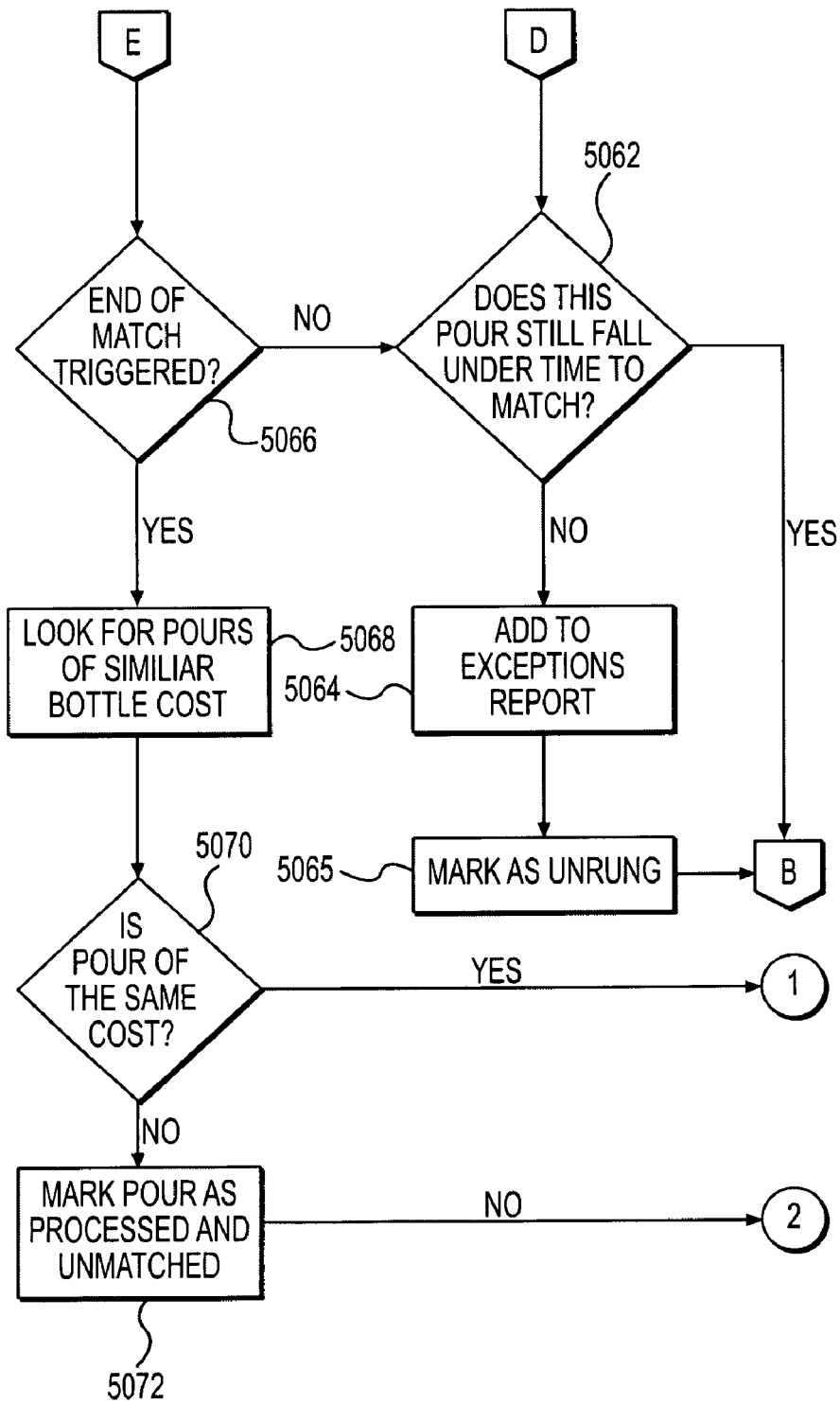
FIG. 10C1

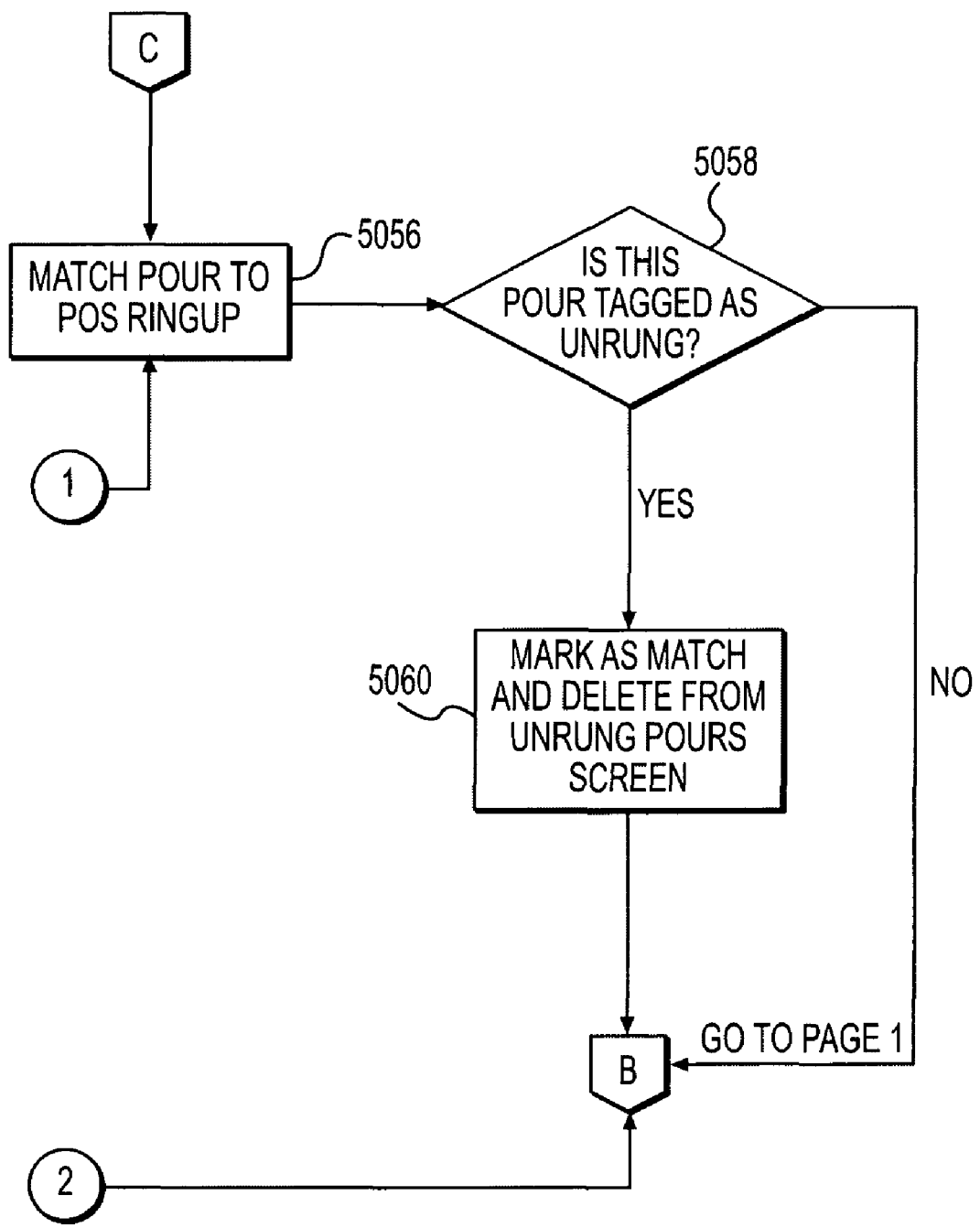
FIG. 10C2

| RING UP DATA ENTRIES | | | |
|---|---|---|---|
| TIME | BART. ID | POS ID | BEVERAGE FAMILY / BRAND |
| 17:26:08 | 0010 | 2 | MALIBU |
| 16:52:13 | 0010 | 2 | BAILEY'S IR CRME |
| 16:52:09 | 0010 | 2 | BAILEY'S IR CRME |
| 14:07:40 | 0015 | 2 | BELVEDERE |
| 13:34:22 | 0010 | 2 | ABSOLUT CITRON |
| 12:18:16 | 0015 | 2 | BELVEDERE |
| 11:28:31 | 0010 | 2 | BELVEDERE |
| 10:14:19 | 0010 | 2 | HENNESSY VSOP |
| 10:04:31 | 0015 | 2 | ABSOLUT CITRON |
| 10:00:09 | 0015 | 2 | ABSOLUT MANADRIN |
| 10:00:08 | 0015 | 2 | ABSOLUT MANADRIN |
| 09:45:57 | 0010 | 2 | GREY GOOSE |
| 09:45:54 | 0010 | 2 | MARTINI VODKA |
| 09:32:13 | 0015 | 2 | HENNESSY VSOP |

| POUR EVENT DATA ENTRIES IN TIME WINDOW | | | | |
|---|---|---|---|---|
| | TIME | BART. ID | VOL. | BEVERAGE FAMILY / BRAND |
| ☑ | 09:44:50 | 0010 | 3.2 | GREY GOOSE |

MATCH PROCESS INFORMATION

STATUS: MATCH IS FOUND

FLAG: NONE

MATCH RESULTS

BEST MATCH: GREY GOOSE MARTINI

MATCHES:

> GREY GOOSE MARTINI RECIPE
> GREY GOOSE RECIPE
> GREY GOOSE COSMOPOLITAN RECIPE
> GREY GOOSE MARTINI RECIPE
> GREY GOOSE APPLETINI RECIPE

INGREDIENTS:

> 2.5oz GREY GOOSE

*FIG. 11*

| RING UP DATA ENTRIES | | |
|---|---|---|
| TIME | POS ID | BEVERAGE FAMILY / BRAND |
| 10:56:47 | 2 | MALIBU |
| 10:52:19 | 2 | BAILEY'S IR CRME |
| 10:52:07 | 2 | GREY GOOSE |
| 10:07:05 | 2 | HENNESSY VSOP |
| 09:34:57 | 2 | ABSOLUT CITRON |
| 09:18:54 | 2 | ABSOLUT MANADRIN |
| 09:32:18 | 2 | ABSOLUT MANADRIN |
| 09:30:13 | 2 | MARTINI VODKA |
| 09:07:23 | 2 | GREY GOOSE |
| 08:35:09 | 2 | GREY GOOSE |
| 08:26:31 | 2 | ABSOLUT MANADRIN |
| 08:23:11 | 2 | SCHAPPLE BARREL |
| 08:19:08 | 2 | AMAR DI SARONNO |
| 08:19:07 | 2 | HENNESSY VSOP |

| POUR EVENT DATA ENTRIES IN TIME WINDOW | | | |
|---|---|---|---|
| | TIME | VOL. | BEVERAGE FAMILY / BRAND |
| ☐ | 08:26:24 | 1.55 | GREY GOOSE |
| ☐ | 08:19:37 | 1.25 | AMARETTO DI SARONNO |
| ☐ | 08:15:24 | 1.05 | BAILEY'S IR CRME |
| ☐ | 08:14:14 | 2.00 | MALIBU |
| ☐ | 08:14:00 | 2.35 | BELVEDERE |
| ☐ | 08:13:24 | 1.00 | GREY GOOSE |

MATCH PROCESS INFORMATION

STATUS: MATCH NOT FOUND

FLAG: NONE

MATCH RESULTS

BEST MATCH:

MATCHES:

NONE

INGREDIENTS:

FIG. 12

| RING UP DATA ENTRIES | | |
|---|---|---|
| TIME | POS ID | BEVERAGE FAMILY / BRAND |
| 04:16:25 | 2 | MALIBU |
| 04:12:13 | 2 | BACARDI 151 RUM |
| 04:11:08 | 2 | GREY GOOSE |
| 04:07:05 | 2 | JOHN WALKER |
| 03:54:57 | 2 | MALIBU |
| 03:48:03 | 2 | ABSOLUT CITRON |
| 03:42:21 | 2 | GLEN FIDDICH |
| 03:40:18 | 2 | MARTINI VODKA |
| 03:37:25 | 2 | GREY GOOSE |
| 03:35:09 | 2 | BAILEY'S IR CRME |
| 03:26:04 | 2 | JOHNNIE WALKER |
| 03:23:44 | 2 | SOUTHERN COMFORT |
| 03:19:14 | 2 | GLEN FIDDICH |
| 03:19:07 | 2 | HENNESSY VSOP |

| POUR EVENT DATA ENTRIES IN TIME WINDOW | | | |
|---|---|---|---|
| | TIME | VOL. | BEVERAGE FAMILY / BRAND |
| ☐ | 03:29:26 | 1.20 | GREY GOOSE |
| ☐ | 03:26:37 | 2.05 | JOHNNIE WALKER |
| ☐ | 03:25:24 | 0.25 | JOHNNIE WALKER |
| ☐ | 03:24:13 | 2.00 | MALIBU |
| ☑ | 03:24:08 | 1.05 | SOUTHERN COMFORT |
| ☐ | 03:23:14 | 1.75 | GREY GOOSE |
| ☐ | 03:22:07 | 2.50 | JOHN WALKER |
| ☐ | 03:21:29 | 0.25 | BACARDI 151 RUM |

MATCH PROCESS INFORMATION

STATUS: MATCH IS FOUND

FLAG: SHORT POUR

MATCH RESULTS

BEST MATCH: SOUTHERN COMFORT RECIPE

MATCHES:

| SOUTHERN COMFORT RECIPE |
|---|
| SOUTHERN COMFORT MANHATTAN RECIPE |

INGREDIENTS:

| 1 oz SOUTHERN COMFORT |
|---|

FIG. 13

| RING UP DATA ENTRIES | | |
|---|---|---|
| TIME | POS ID | BEVERAGE FAMILY / BRAND |
| 04:16:25 | 2 | MALIBU |
| 04:12:13 | 2 | BACARDI 151 RUM |
| 04:11:08 | 2 | GREY GOOSE |
| 04:07:05 | 2 | JOHN WALKER |
| 03:54:57 | 2 | MALIBU |
| 03:48:03 | 2 | ABSOLUT CITRON |
| 03:42:21 | 2 | BELVEDERE |
| 03:40:18 | 2 | MARTINI VODKA |
| 03:37:25 | 2 | GREY GOOSE |
| 03:27:09 | 2 | MALIBU |
| 03:26:04 | 2 | JOHNNIE WALKER |
| 03:23:44 | 2 | MALIBU |
| 03:19:14 | 2 | GREY GOOSE |
| 03:19:07 | 2 | GREY GOOSE |

| POUR EVENT DATA ENTRIES IN TIME WINDOW | | | |
|---|---|---|---|
| | TIME | VOL. | BEVERAGE FAMILY / BRAND |
| ☐ | 03:26:46 | 1.35 | MARTINI VODKA |
| ☐ | 03:26:37 | 2.55 | JOHNNIE WALKER |
| ☐ | 03:25:24 | 1.25 | BELVEDERE |
| ☐ | 03:24:53 | 1.07 | GREY GOOSE |
| ☑ | 03:24:41 | 2.00 | MALIBU |
| ☐ | 03:20:17 | 1.05 | GREY GOOSE |

MATCH PROCESS INFORMATION

STATUS: MATCH IS FOUND
FLAG: LONG POUR

MATCH RESULTS

BEST MATCH: MALIBU RECIPE

MATCHES:

MALIBU RECIPE

INGREDIENTS:

1 oz MAILBU

FIG. 14

MONITORING BEVERAGE DISPENSING USING POUR EVENT DATA AND RING UP DATA

CROSS-REFERENCE TO RELATED APPLICATIONS

This application claims priority to U.S. Provisional App. No. 60/850,261, filed on Oct. 10, 2006, the entire disclosure and contents of the above application is incorporated by reference. This application is also a continuation-in-part application of U.S. patent application Ser. No. 10/990,544, entitled "Service Transaction Monitoring System, Method and Device," filed on Nov. 18, 2004, which is a divisional application of U.S. application Ser. No. 10/243,545, entitled "Service Transaction Monitoring System, Method and Device," filed on Sep. 16, 2002, now U.S. Pat. No. 7,196,624, which is a continuation of U.S. App No. 09/733,719, entitled "Service Transaction Monitoring System, Method and Device," filed on Dec. 8, 2000, now U.S. Pat. No. 6,504,481, which claims the priority of U.S. Provisional App. No. 60/169,918, filed on Dec. 10, 1999. The entire disclosure and contents of the above applications are hereby incorporated by reference.

BACKGROUND

1. Field of the Invention

The present invention relates generally to monitoring inventory and more specifically to matching pour event data that is independently obtained with ring up data to monitoring beverage dispensing.

2. Related Art

Establishments, such as restaurants, bars, nightclubs, lounges, hotels, etc., lose a significant amount of revenue due to pilferage at the point of sale, pilferage of bottles from the bar and storage areas and dispensing of drinks to "buddies." In addition revenue loss is also attributable to manual and error-prone methods of establishing and keeping metrics. Critical metrics such as pouring cost, pour accuracy and inventory values are calculated as infrequently as once a month, or manually on "inventory" day. The task of counting and measuring beverage inventory and calculating pouring costs is time consuming and open to intentional and unintentional errors.

Technical solutions exist that address some of the described problems. For instance multiple serving bottles can be fitted with a control or counting device in the neck of the bottle, or drinks can be dispensed through a gun or other electro/mechanical device. Other solutions include measuring the amount poured prior to serving, or weighing bottles after each serving or at the end of a shift or week. These solutions are typically used in airports and casinos where customer satisfaction takes second place to controls. Further these controlled-pour solutions require cleaning between uses.

Existing systems and methods have a negative impact on customers and on the bar aesthetic, and are therefore rejected by the vast majority of establishments. Thus, most establishments, such as casual and fine dining, choose to suffer pilferage and inefficiencies that are endemic to the industry, rather than aggravate their customers with controlled or measured pours and devices that disturb the ambiance and aesthetic of the point of sale.

SUMMARY

According to a first broad aspect of the present invention, there is provided a method for monitoring beverage dispensing from a container comprising: receiving ring up data for a transaction of the beverage dispensing; determining one or more beverage brands from a selected drink recipe using the ring up data; and matching the ring up data with at least one of a plurality of pour event data entries using the determined one or more beverage brands, wherein each of the plurality of pour event data entries is obtained independently of the ring up data.

According to a second broad aspect of the present invention, there is provided a method for monitoring beverage dispensing from a container comprising: identifying two or more pour event data entries each having a same beverage brand that occur within a time window and one of the two or more pour event data entries has a volume that is less than a short pour size, wherein the time window is based on a first ring up data entry; creating a composite pour from the two or more identified pour event data entries; and matching the composite pour with a second ring up data entry.

According to a third broad aspect of the present invention, there is provided a method of monitoring beverage dispensing from a container comprising: determining that the number of two or more ring up data entries for a same beverage brand exceeds the number of pour event data entries for the same beverage brand in a time window based on at least one of the two or more ring up data entries; combining volumes of all of the pour event data entries in the time window having the same beverage brand; creating two or more pours from the combined volume, each of the two or more split pours have a same volume; and matching each of the two or more split pours to each of the two or more ring up data entries.

According to a fourth broad aspect of the present invention, there is provided a method for monitoring beverage dispensing from a container comprising: receiving ring up data for a transaction of the beverage dispensing; determining one or more beverage brands and associated volume for each of the one or more beverage brands from a selected drink recipe using the ring up data; and matching the ring up data with at least one of a plurality of pour event data entries using the determined one or more beverage brands and the associated volume, wherein each of the plurality of pour event data entries is obtained independently of the ring up data.

BRIEF DESCRIPTION OF THE DRAWINGS

The invention will be described in conjunction with the accompanying drawings, in which:

FIGS. 10A1, 10A2, 10B1, 10B2, 10C1, and 10C2 are a flow chart showing the sub-steps of point of sale (POS) matching in accordance with embodiments of the present invention; and FIGS. 11, 12, 13, and 14 are representative display screens used during the matching processes in accordance with various embodiments of the present invention.

DETAILED DESCRIPTION

The present invention provides an automated system and process for matching data received from a pour event with data received ring up. The pour event and ring up are independent of each other, but both occur to complete a transaction of providing a drink serving to a customer. The ring up data is associated with entering the transaction, while the pour event data is associated with the act of dispensing a beverage. A successful match links the pour event data with the ring up data, and the linked data may be used for real time inventory monitoring. In some embodiments a successful match may link the data of one or more pour events with the data of one ring up, when, for example, the ring up is for a drink recipe that uses several ingredients. A unsuccessful match indicates an error condition that flags the data and generates an alert. These flagged error conditions are used also for real time inventory monitoring. Such systems and processes of the present invention enhance an establishment's ability to accurately and reliably monitor inventory in real time. In addition, embodied systems and processes of the present invention do not require the establishment to significantly modify its business practices or procedures and thereby do not distract from the ambiance.

Embodiments of the present invention are particularly suited to drink recipes containing alcoholic beverages. However, the embodiments are not limited to alcoholic beverages and may be used with other beverages having a high cost per volume ratio.

Figure 1:
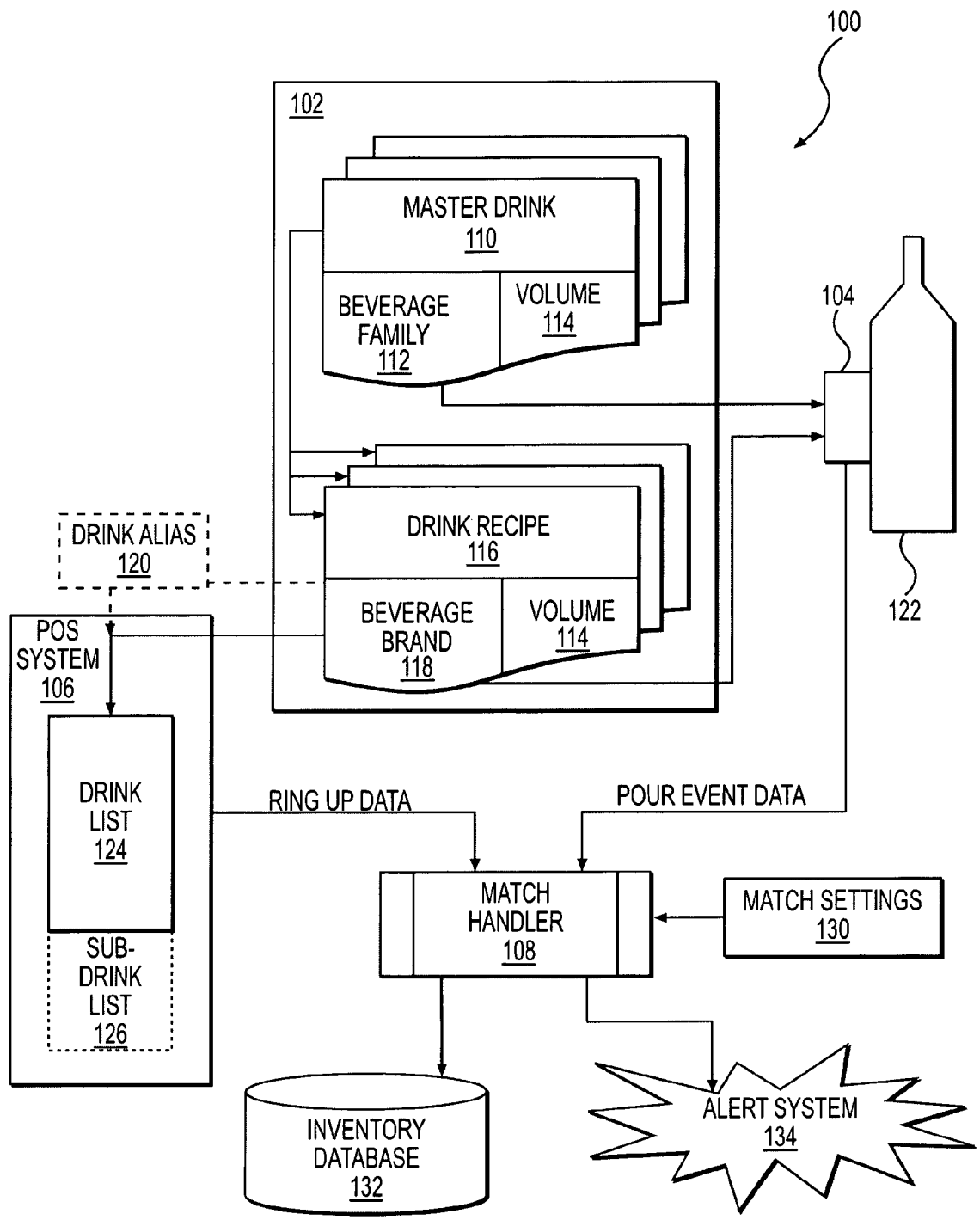
FIG. 1 is a schematic diagram of a matching system in accordance with an embodiment of the present invention.

FIG. 1 is a schematic diagram of an exemplary matching system 100 according to an embodiment of the present invention. System 100 comprises a recipe database 102, sensor device 104, point-of-sale (POS) system 106 and matching handler 108. System 100 may be arranged in an establishment, such as a restaurant, bar, nightclub, lounge, hotel, etc. In some embodiments, recipe database 102 and matching handler 108 may be located at different locations, such as a off-site administrative or processing office, than the establishment where the sensor device 104 and POS system are used. In addition, the number of components used with system 100 is configurable and expandable.

Recipe database 102 comprises a plurality of master drinks 110 that each specify one or more beverage families 112 and an associated volume 114. Master drinks 110 are standard recipes of various drink servings that are provided to customers. For each master drink 110 one or more drink recipes 116 are specified. Drink recipes 116 include one or more ingredients, each ingredient including a beverage brand 116 in the associated volume 114 specified by master drink 110. Beverage brands 118 are specific brands, i.e. trademarked beverages, of the generic beverage family 112. Drink recipes 116 are configurable depending on the specified beverage brand 118 used for beverage family 112. Beverage families 112 and beverage brands 118 are provided to POS system 106. Optionally, each drink recipe 116 has a drink alias 120 that is provided to POS system 106. Master drinks 110 and drink recipes 116 may be included in a series of lookup tables.

Recipe database 102 is configurable such that the number of beverage families/brands may be adjusted, as well as the associated volume. Drink recipes 116 may include additional ingredients not specified by master drink 110. For those additional ingredients, an associated volume is created for the drink recipe. In addition, while most drink recipes 116 are based on master drinks 110, an establishment may create a specialty drink serving having a drink recipe 116 not specified by master drinks 110. In some embodiments, master drinks 110 may be stored in a recipe database 102 at a central location which communicates with recipe databases 102 at one or more establishments. Such establishments may each have different drink recipes 116 stored on their recipe databases 102.

Drink recipes 116 may also include a designation that the beverage brand 116 is a rail brand. Rail brand designation indicates that different beverage brands may be used interchangeably in the drink recipe 116. Typically the rail brands will be associated with the same beverage family, such as all beverage brands for rum, all beverage brands for vodka, etc. In some embodiments rail brands may be group according to price, such that lower priced alternatives may be used for drink recipes 116 having a rail brand designation.

Sensor device 104 is attached to the inventory, i.e. beverage containers 122. Sensor 104 stores information regarding the beverage family and beverage brand of the container 122 to which sensor device 104 is attached. Sensor device 104 monitors each pour event of container 122 and transmits the measured information, time of pour event, including the beverage family and beverage brand, to match handler 108 as pour event data. Pour event data may also include other information such as sensor identification, operator identification, duration of pour event, cost of the beverage in the container, location of pour event, volume of beverage poured, calculated volume, etc. Sensor device 104 may also monitor when the container is switched, when container is damaged, or the location of the container. In one embodiment of the present invention the pour event data is sent through a wireless communication link to match handler 108. In other embodiments, pour event data may be received by one or more data receivers prior to being transmitted to match handler 108.

POS system 106 is used to record, i.e. ring up, the transaction associated with the beverage dispensing. An operator, i.e. bartender, waiter, manager, etc., may select a beverage family 112, beverage brand 118, or optional drink alias 120 from a drink list 124 that corresponds to the pour event. In some embodiments, a sub-list 126 may be used that contains the most frequency types of transactions and the associated drink alias 118. The sub-list 126 may be configured by a operator. The selected items from drink list 124, or sub-list 126, along with data such as the time of the transaction, the location of the POS system 106, POS identification, operator identification, cost, volume, etc., comprises ring up data. POS system 106 transmits the ring up data to match handler 108.

Match handler 108 records and enters the received ring up data and the received pour event data. Using match settings 130, match handler 108 links each ring up data entry to one or more pour event data entries. In various embodiments, matching occurs automatically at a configurable interval, or matching occurs upon the request of the operator. Once a match is made, the ring up data entry is linked with the corresponding one or more matched pour event data entries. The linked data may be recorded in an inventory database 132. When no match is made, the error condition may be reported on an alert system 134. The unmatched ring up entry may be recorded in inventory database 132. In addition, any of the pour event data entries that are not matched after checking against the ring up entries may also be recorded in inventory database 132. Inventory database 132 is updated in real time so that the operator may accurately and reliably discern the amount of inventory being used and accounted for in the establishment.

In one embodiment, recipe database 102 may be stored on a hard disk drive or optical disk of a computer and matching handler 108 may comprise software running on the computer. The computer may have an I/O port or network port for communicating with POS system 106 and sensor device 104. In one embodiment, the computer operates at the establishment where the pour event and ring up occurs, while in other embodiment the computer is operating at a remote office. When operating at a remote office, a Web server may be used to send data from the establishment to the remote office.

Sensors device 104 used with embodiments of the present invention may be contactless sensors such as those described in U.S. Pat. Nos. 6,504,481, 7,196,624, 7,202,780, and 7,265,673, and U.S. Provisional Patent Application Nos. 60/850,261 and 60/854,117, the entire contents and disclosures of which are hereby incorporated by reference. Other types of sensor devices may include valve control sensors, which regulate the flow of the beverage through a valve port. The sensor device may also be integrated with free pour devices, such as Posi-Pour™ I, II, and 2000 and Liquor Saver 2000 by Magnuson Industries, Inc. Such free pour devices may use a ball bearing valve to regulate portions dispensed by a bottle. The sensor device may also be integrated with monitoring systems such as the scale system and jigger described in U.S. application Ser. No. 11/428,448, filed on Jul. 3, 2006, the entire contents and disclosures of which are hereby incorporated by reference.

Figure 2A:
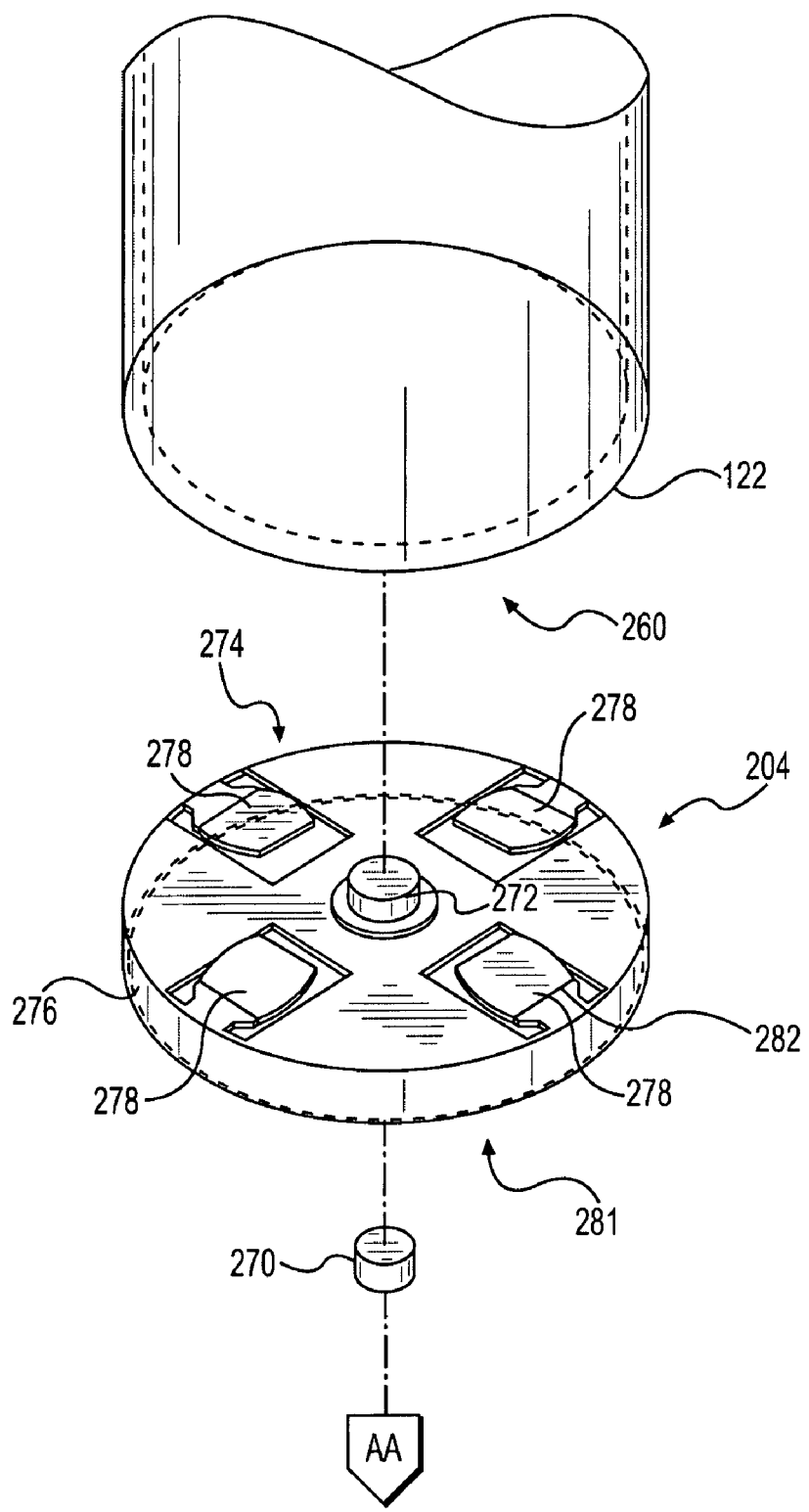
FIGS. 2A and 2B are an exploded view of a sensor device and holder used with embodiments of the present invention.
Figure 2B:
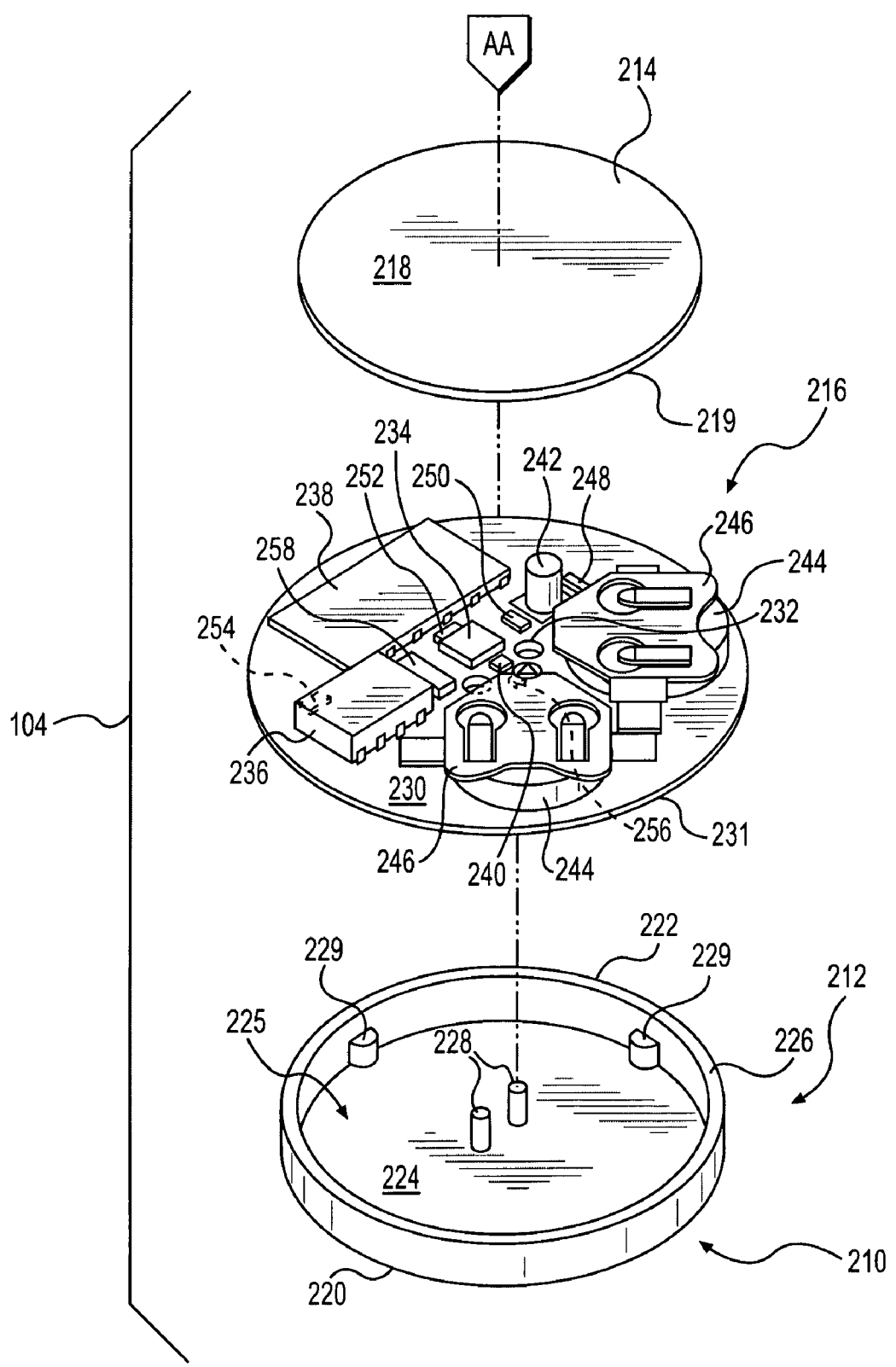

In a first embodiment of the present invention, sensor device 104 in FIGS. 2A and 2B comprises a housing 210 and holder 204. Sensor device 104 is in housing 210 and is inserted within holder 204. Holder 204 is attached to container 106. Sensor device 104 includes housing 210, having a cup portion 212 and lid 214, for holding a printed circuit board 216. Lid 214 has an upper surface 218 and a lower surface 219. Cup portion 212 has a surrounding wall 220, upper rim 222, and a substantially planar bottom 224. Wall 220 and bottom 224 form a cavity 225 to receive circuit board 216. On upper rim 222, along the inside circumference of wall 220, there is an inner ledge 226 which is slightly below the plane of upper rim 222. Lower surface 219 of lid 214 rests upon inner ledge 226 when assembled. On bottom 224 there are posts 228, and projections 229. Two posts 228 are positioned approximately in the center of bottom 224 for aligning circuit board 216. Posts 228 may extend and contact lid 214 to support lid 214 and to prevent lid 214 from contacting circuit board 216. Projections 229 are positioned along wall 220 for supporting circuit board 216. In some embodiments of the present invention, projections 229 have a smaller height than posts 228.

Printed circuit board 216 has an upper surface 230 directed towards lid 214 and a lower surface 231 that contacts projections 229. Circuit board 216 has apertures 232 which align with posts 228 and have a sufficient diameter to fit around posts 228. In some embodiments, upper surface 230 and lower surface 231 do not directly contact lid 214 or bottom 224, which may provide space for placing of components upon printed circuit board 216. The components may be placed on either upper surface 230 or lower surface 231, or both. In one exemplary embodiment, the following components are placed on upper surface 230, by soldering or other suitable techniques. Such components may include microcontroller 234, radio transmitter 236, radio antenna 238, magnetic sensing or Hall effect switch 240, mercury tilt switch 242, battery 244, battery holder 246, pull-up resistors 248 and 250, bypass capacitors 252, 254, and 256, and oscillator 258.

Microcontroller 234 has a unique identifier, which may include numbers or letters. While, these components are exemplary, printed circuit board 216 may also hold additional components, such as memory or storage devices and may have any type of circuit layout suitable the shape of housing 210. For example, in lieu of radio transmitter 238, an infrared or other type of wireless transmitter could be used, and, in lieu of magnetic sensing switch 242, a mechanical switch could be used.

FIG. 2A also shows sensor device 104 attached to the underside 260 of container 122 using holder 204. In some embodiments, holder 204 may have a substantially similar shape of sensor device 104 and may be slightly larger. Holder 204 includes magnet 270, magnet cavity 272, top portion 274, side portion 276, and flap portions 278. Top portion 274 is a thin, planar portion having upper surface 280 and lower surface 281. Side portion 276 is a wall having a slightly larger perimeter than sensor device 104. Flap portions 278 are generally rectangular in shape and are cut out of top portion 272 on three sides such that flap portion 278 are nonremovably, but flexibly, attached to top portion 274 along edge 282. In some embodiments, four flap portions 278 may be used, although a greater or lesser number may also work with other embodiments of the present invention depending on the dispensing container. Magnet 270 fits inside magnet cavity 272 and may be accessible on lower surface 281.

Sensor device 104 fits tightly into holder 204 such that when holder 204 is affixed to container 122, sensor device 104 is securely, but removably, attached to dispensing container 122. Thus, sensor device 104 is relatively unobtrusive and may not block or obstruct the flow of the beverage from dispensing container 122. When sensor device 104 is in holder 204, a lid portion 214 of sensor device 104 comes into proximity with lower surface 281 of top portion 274 such that magnetic sensing switch 240 comes into proximity with a magnet 270 of holder 204. Such an arrangement causes magnetic sensing switch 240 to close. This may be most easily achieved if magnetic sensing switch 240 and magnet 270 are both commonly located upon sensor device 104 and holder 204, respectively. This triggers microcontroller 234 to send data to radio transmitter 236. The data may include a unique identifier for microcontroller 234, the time trigger occurred, duration of tilt and the status of sensor device 104. The status of sensor device 104 is either active or inactive. The status is active if magnetic sensing switch 240 is closed. The status is inactive if magnetic sensing switch 240 is open, when magnet 270 is no longer in proximity with switch 240. Radio transmitter 236 uses radio antenna 238 to send data in a radio frequency, for example a frequency of 219 megahertz, to data receiver (not shown) or computer.

Sensor device 104 of the first embodiment of the present invention operates to perform the function of motion monitoring, tilt sensing, data recording and data transmitting. Batteries 244 provide direct voltage to all components of any such circuit. There may be separate ground nets for analog and digital signals which connect only at battery terminals (not shown). A clock of microcontroller 234 may be set by oscillator 258 at an approximate frequency of four megahertz and is connected to oscillator inputs of microcontroller 234 oscillator inputs. Bypass capacitor 252 is connected between the power of microcontroller 234 power and ground to provide current reserves, preferably of 0.1 µF value. Magnetic sensing or Hall effect switch 240 has an output that changes state in the presence of a magnetic field. Output of magnetic sensing switch 240 is fed to an input on microcontroller 234. Power for magnetic sensing switch 240 is provided by an output from microcontroller 234, allowing it to be turned off when not needed to extend the life of battery 244. Bypass capacitor 256, preferably of 0.1 µF value, is connected between the power of magnetic sensing switch 234 power and ground pins. Resistor 250 is a high-value pull-up resistor connected between magnetic sensing switch 240's output and power pins and the output of magnetic sensing switch 240 output is an open-collector. Mercury tilt switch 242 is connected to an input on microcontroller 234. Pull-up resistor 248, which along with mercury tilt switch 242, provides a digital input to microcontroller 234 indicating the state of mercury tilt switch 242. Input of radio transmitter 236 is connected to an output from microcontroller 234. Bypass capacitor 254, preferably of 0.1 µF value, is connected between the power of radio transmitter 236 and ground pins. Antenna 238 is a wireless communication for radio transmitter 236 and is connected to the output of radio transmitter 236.

In addition to the position of sensor device 104 shown in FIGS. 2A and 2B, sensor device 104 may also be constructed to fit around the neck or the side of the dispensing container. Further, when the dispensing container has a tap or a handle that is pulled to release the liquid, the sensor device may be positioned upon the handle as to not obstruct the flow of the beverage.

Figure 3A:
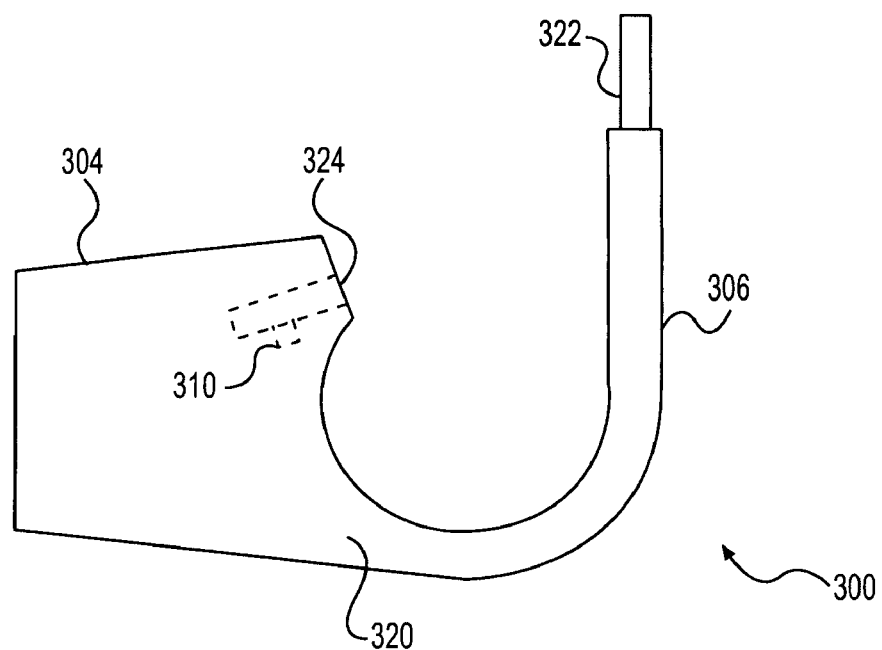
FIGS. 3A-3F are various views of an omega-sensor device used with embodiments of the present invention.
Figure 3B:
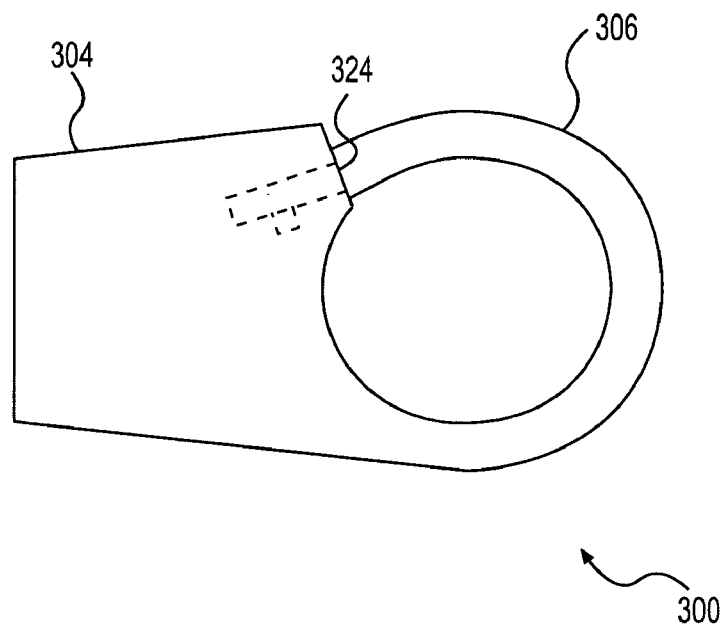
Figure 3C:
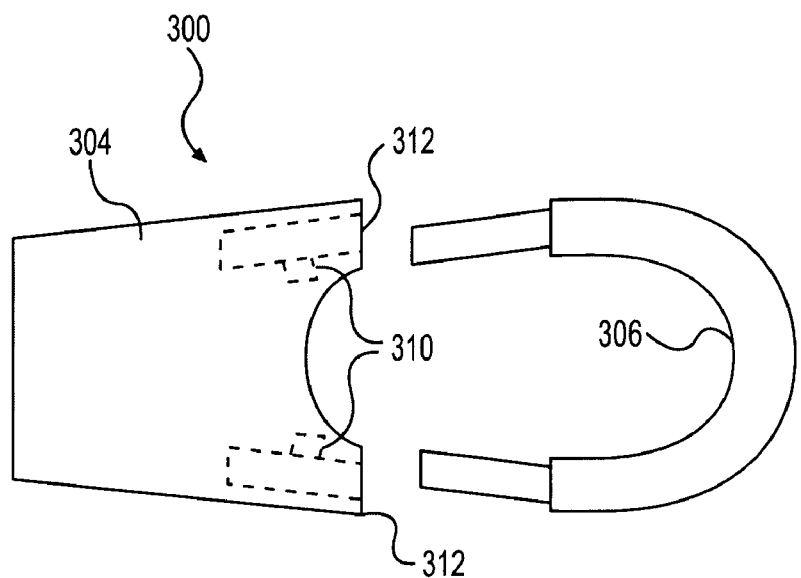
Figure 3D:
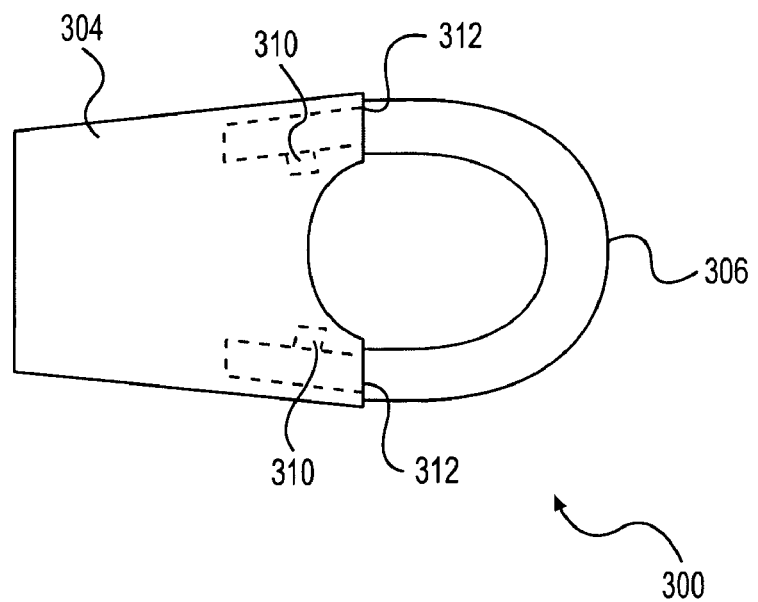

In a second embodiment of the present invention, sensor device 104 has a horseshoe or Omega (Ω) housing shape as shown in FIGS. 3A-3D. The housing shape may allow sensor device 104 to have a tight releasable fit with a variety of differently shaped and sized bottles to which sensor device 104 may be attached. In FIGS. 3A-3D, housing 304 may have a leg 306 that slips over a pour spout or the neck of a bottle (not shown) and leg 306 is inserted into housing 304 to form a loop 308. Leg 306 may operate similar to a lasso so housing 304 may accommodate a variety of different sized bottles. Leg 306 may be flexible to bend or curve around the bottles. Leg 306 may activate the sensor device by toggle a switch 310 such that the leg may not be removed without the switch being activated again. The switch may be activated again when the sensor device determines that the bottle is empty or during an override by a manager or supervisor. As shown in FIGS. 3C and 3D, leg 306 may be inserted into two holes 312 on housing 304 and one or both holes may have toggle switch 310. As shown in FIGS. 3A and 3B housing 304 and leg 306 are formed in an integrated unibody construction. In FIGS. 3A and 3B there is shown one end 320 of leg 306 may be molded or attached to housing 304 and the free end 322 of leg 306 may be inserted into a hole 324 of housing 304 having the toggle switch 310 therein. Further embodiments may use a tie wrap to secure housing 304 to the bottle.

Figure 3E:
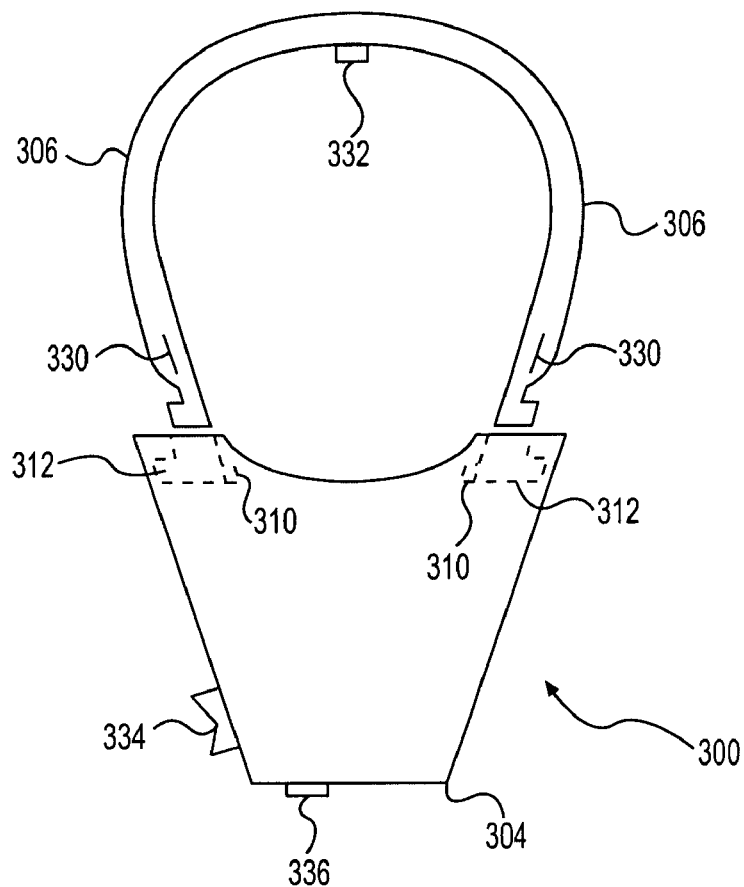
Figure 3F:
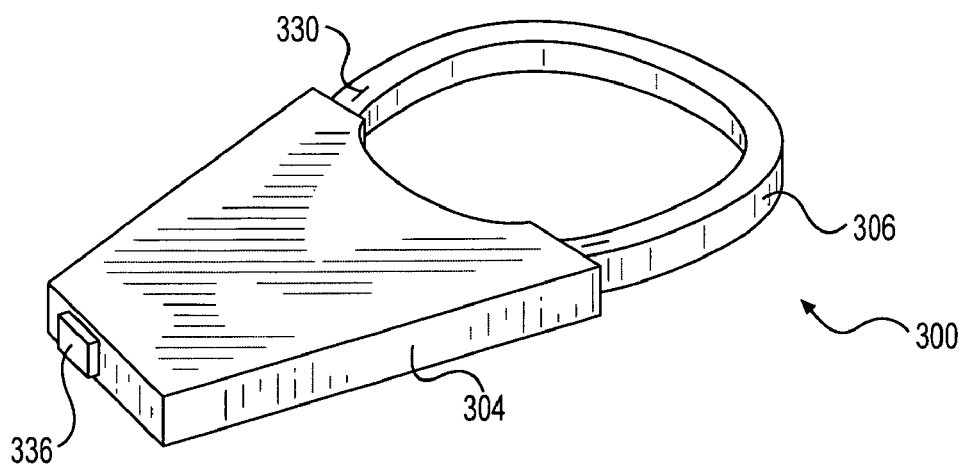

Omega-sensor devices 104 of the second embodiment may have two legs 306 as shown in FIGS. 3E and 3F. An omega-sensor device 300 may have holes, catches, or grooves 330 that are used to allow a tool to be inserted for placement or removal with a tool or tool system. Omega-sensor device 300 may have a switch 332 on the inside portion of one or two of its legs so that when omega-sensor device 300 is pressed onto a bottle switch 332 is activated. In addition, omega-sensor device 300 may have a second switch 334 that can be manually toggled to determine which person is using the bottle. For example, when second switch 334 is off sensor device 300 may indicate employee 1 and when second switch 334 is on sensor device 300 may indicate employee 3. Further, on/off in rapid succession may indicate another employee 3 and so forth. Omega-sensor device 300 may also have a LED 336.

Omega-sensor device 104 of the second embodiment may have similar electronic components as the first embodiment for monitoring the tilt of the bottle, recording and storing the data associated with the tilt and transmitting the data to a remote computer or receiver. The omega-sensor device 104 includes a battery which has an operational lifetime of approximately 5 years. The battery, such as a lithium ion or lithium polymer battery, may provide sufficient power of approximately 3.0 volts. In some embodiments the omega-sensor device may use an inductively powered tag/sensor, which does not require a battery, attached to the bottle that is energized by an outside source/receiver (like an RFID tag) and sends its data to the receiver. The inductively powered tag may also be used in combination with a battery that powers other electronic components of the sensor device.

Sensor devices of the first and second embodiments may include housings that are made from materials that are impact resistance and water resistance. The housing may have a low profile, aesthetic shape and design which does not infer with the ambiance of the establishment. The sensor device may be stored in temperatures of between −40° C. to 80° C. and have an operation temperature range of −20° C. to 80° C.

Sensors device 104 used in the present invention may buffer or store the data to ensure reliable data communication. For example, the sensor device may buffer data using flash memory or similar buffering means for approximately 24 hours after the dispensing event. In other embodiments, in addition to the buffering of the sensor device, the receiver or computer may also buffer data. Sensor devices of the present invention may prevent data loss under a variety of circumstances. Such buffer features of embodiments of the present invention also allow dispensing during catered events which may be held outside of establishments. This allows a caterer to use sensor devices at a wedding or banquet and then send the data stored in the sensor devices once the caterer returns back to the office or establishment.

The sensor device may include a transceiver which is able to transmit data and receive communication signals from a computer. The transmission of data may include the location of the sensor device, status of sensor device and any buffered data in sensor device. This allows a user to request that the data be sent at any time from any location. Prior to the transmission of data, the sensor may perform a transmission handshake with the computer to confirm that the data that the communication data is received. Further transmission may hop frequency bands to find a frequency that is not occupied or busy. In some embodiments, the wireless range and reliability may be increased by using a mesh networking. Mesh networking involves each sensor device to receive data from proximate sensor devices and as this network or chain of communications continues along a "path" of sensors the sensor near an internet or computer connected receiver hands over the data from the first or any other or any number of sensors in the network. As the data is handed over from sensor device to sensor device the data unique to each sensor device is linked to its unique number. Thus a sensor device far down the chain may receive data from several sensor devices, e.g. 20 sensor devices, that has been handed from sensor device to sensor device. An advantage of such embodied system is that no Intranet, Internet or computer connection must be directly set up in difficult to install locations and since the mesh networked sensor devices are hermetically sealed and communicate wirelessly through the transmitters and receivers. This increases the portability of the sensor device since the sensor device may be used in multiple diverse locations, i.e. party boats, mountain lodges, sporting events, festivals, outdoor weddings, etc.

The sensor devices may further include one or more light emitting diode lights (LEDs) that may perform many functions. The LED may be controlled by the sensor device or wireless through the remote computer or an Internet server.

Some of the LEDs may be used when testing the sensor device to ensure that the device is functioning and able to communicate on the wireless RF link. In addition, the LEDs may blink when data from the sensor device is not reconciled with the ring ups on the POS. The LEDs may also blink periodically, such as every hour, to confirm working operation. The LEDs may blink when being attached or removed from the bottle or pouring device. In some embodiments, the LEDs may be programmed to flash or blink in patterns to encourage selling or as part of a promotional/marketing event at the establishment.

The sensor devices may calculate the volume of beverage dispensed using the pour rate method described in U.S. Pat. No. 6,504,481, the entire contents and disclosure of which is hereby incorporated by reference. The calculated volume from sensor devices may also be performed by a computer that receives the pour event data.

Returning to FIG. 1, suitable POS systems 106 for embodied systems of the present invention include cash registers. In one embodiment, registers allow the operator to enter information regarding the transaction, referred to as ring up data, through entering means, such as keyboard, keypad, touch pad, magnetic swipe card, etc. Suitable register have one or more communication connections for sending and receiving data. Also, the register may have a storage device for recording the ring up data. The register may be a hand held device such as a PDA, cell phone, or other similar electronic devices.

Match handler 108 may be implemented as software which operates on a computer such as personal computer, laptop, PDA, cell phone, or other similar electronic device. The computer receives and records pour event data entries and ring up data entries from sensor device 104 and POS system 106, respectively. Additional data may be received from other devices, such as cameras, scales, RFIDs, etc. In one embodiment, the entries are stored on a separated database or location from match handler 108.

Every time a beverage transaction is entered, the match handler 108 receives ring up data from the POS system 106. In one embodiment, after each time a container is poured, the match handler 108 receives pour event data from sensor device 104. In other embodiments, after each time a container is titled, the match handler 108 receives pour event data from sensor device 104. It should be understood that an establishment may have one or more sensor devices 104 and POS systems 106. The entries may be stored on a hard disk drive or in memory. When multiple sensor devices 104 or POS systems 106 are used, one computer operating match handler 108 processes and resolves all the ring up entries.

The present invention provides an automatic system and method for matching the separate data entries. The data entries come from different sources and are independent of each other. Such matching provides accurate and reliable real time inventory monitoring. This allows establishments to control costs, reduce pilferage, and enhance inventory tracking. The matching occurs without adversely distracting from the ambiance of the establishment.

Turning now to the process, the following flowcharts illustrate the process for matching ring up data and pour event data in accordance with embodiments of the present invention. These processes may be implemented as a software program operating on a computer.

Figure 4:
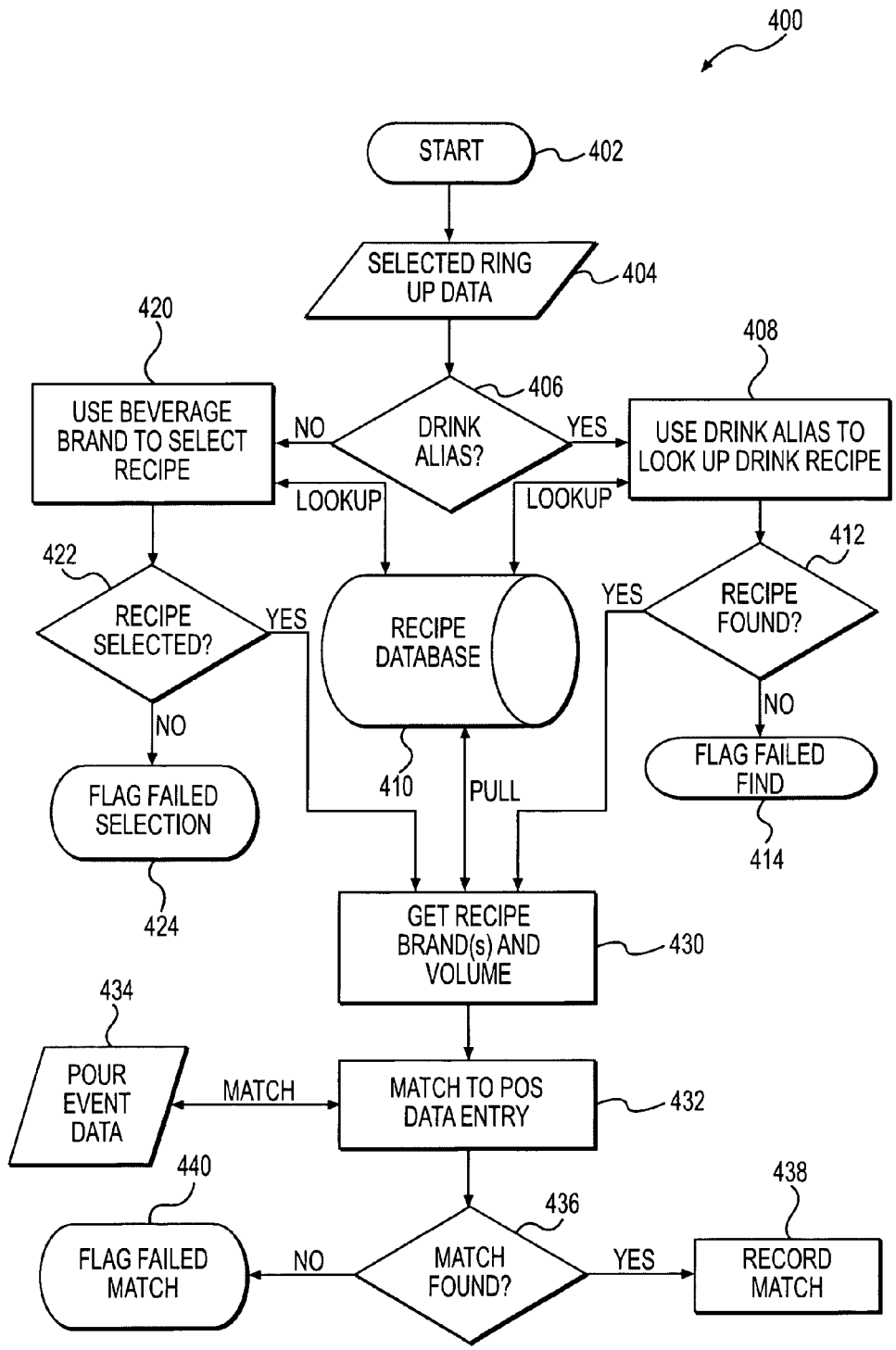
FIG. 4 is a flowchart of an overview process in accordance with embodiments of the present invention.

FIG. 4 provides an overview of an exemplary matching process 400. Match handler continuously enters the received ring up data and pour event data, and to start 402 the match handler loads all the previous unmatched ring up data entries and selects one of the ring up data entries to match. In one embodiment, the match settings instruct the match handler to automatically select the oldest in time unmatched ring up data entry that is loaded. In another embodiment, the match settings instruct the match handler to automatically select the last unmatched ring up data entry that was entered within five minutes. These match settings are configurable and may be modified as necessary. An operator may also command the match handler to select one of the ring up data entries to perform a match process. The selected ring up data 404 is loaded. The selected ring up data 404 may comprise drink alias or the beverage brand entered with the transaction. The process determines whether the ring up data contains a drink alias 406. When a drink alias is present, the process at 408 lookups in recipe database 410 a drink recipe that corresponds to the drink alias. The drink recipe from recipe database 410 indicates the number of ingredients and the beverage brands for each of the ingredients. The ring up data may match several drink recipes, provided that all of the beverage brands associated with the entered drink alias are found in each of the drink recipes. The process at 412 determines if at least one match between the recipe database 410 and ring up data 404 is found, when no match is found, the process flags, at 414, the potential error in the ring up data. The flagged ring up data may be checked at a later time, such as part of an audit or when recipe database 410 is updated. A successful match allows the process to continue 430.

Returning to step 406, when a drink alias is not present, the process at 420 lookups the beverage brands entered with ring up data 404 in recipe database 410. Several drink recipes may be found based on the beverage brand. From the several drink recipes, at least one drink recipe is selected at 422. The selection may be made based on the frequency of recipe information used or price of beverage. The process may track previously matched ring up entries to determine the frequently used drink recipes. Frequently used drinks may also be determined by scrapping other environmental data, such as frequent drinks based on holidays, or events, temperature, news, time of day, special promotions, etc., from the establishment. A successful selection of at least one drink recipe allows the process to continue 430. The process may choose several drink recipes having the same beverage brand as the ring up data.

When no selection can be made because none of the drink recipes contain the beverage brand, the process flags, at 424, the potential error in the ring up data. The potential error may be as a result of a customer who orders a distinct beverage that does not have recipe. The flagged ring up data may be checked at a later time, such as part of an audit or when recipe database 410 is updated.

In step 430, the process loads the each of the beverage brands from the selected drink recipes by pulling the information from the recipe database 410. When using the beverage brands, the volume is not required to be matched. Such embodiments may be used with sensor devices that do not measure of calculate the volume for each pour event. In one embodiment, the process loads both the beverage brands and associated volume, and thus both the beverage brand and associated volume may be matched. The process may determine which match is necessary based on the received pour event data. In addition, other information from the ring up data, such as time, identification of operator, location, etc., may also be loaded depending on the match process settings. Next, in step 432, the process matches one of the drink recipes to pour event data 434. The process determines if a successful match is found 436, and if so, records the match between the ring up data and pour event data 438. When no match can be made, the ring up data 404 is flagged 440. Also, any pour event data 434 not matched may be flagged as well.

Figure 5:
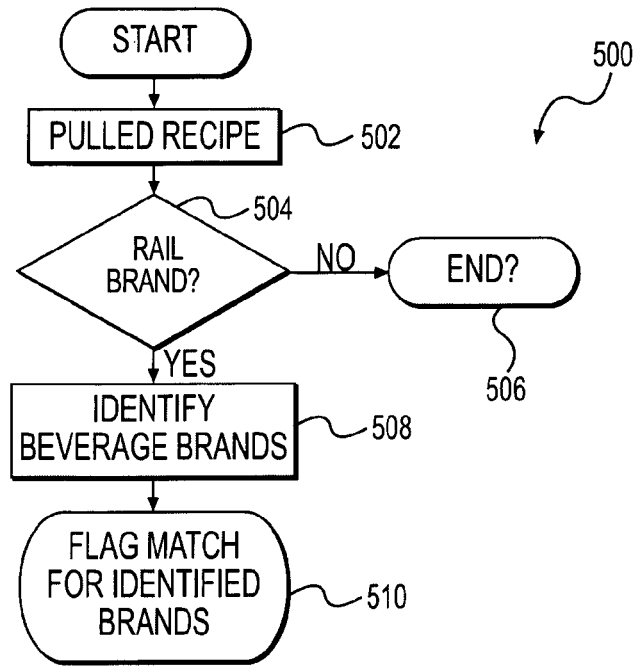
FIG. 5 is a matching sub-process flowchart for rail brands in accordance with embodiments of the present invention.

The process of the embodiments of the present invention may also run a sub-process, or sub-routine, 500 when the drink recipe is designated with a rail brand. The match setting may instruct the match handler to run this sub-process. In FIG. 5 for each drink recipe that is pulled in step 530 of FIG. 5 from the recipe database at 502, the sub-process checks for a rail brand indication in the drink recipe 504. When not present, the sub-process ends 506. When a rail brand indication is present, the sub-process identifies at 508 all beverage brands for the drink recipe. This may include identifying all of the possible beverage brands for a beverage family. During the matching process each of these beverage brands will be used, with the provision that only one of the beverage brands should be linked with the pour event data. A flag is created to indicate the provision for the rail brand matching in 510 and the sub-process ends.

Figure 6:
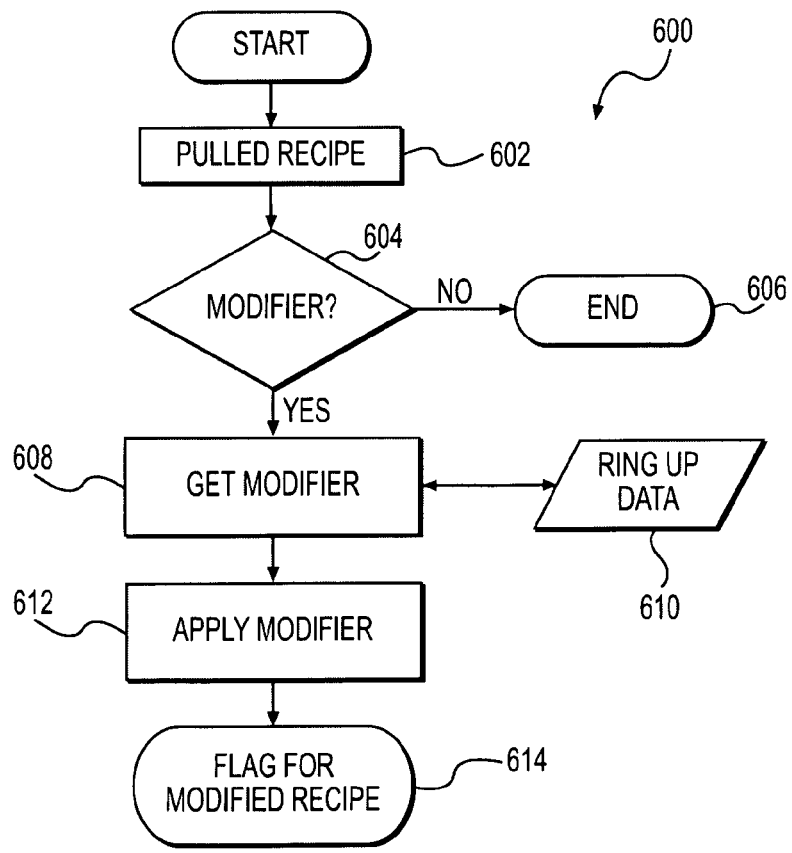
FIG. 6 is a matching sub-process flowchart for modifiers in accordance with embodiments of the present invention.

The process of the embodiments of the present invention may also run a sub-process, or sub-routine, 600 when the ring up data indicates that the recipe is modified. The match setting may instruct the match handler to run this sub-process. A modification may be made by the operator or at the request of the customer to change a drink recipe. In one embodiment, the modification is entered at the POS system and sent to the match handler with the ring up data. The modification could be an increase in volume or change in the recipe, by either adjusting the ingredients or substituting the beverage brands. In FIG. 6, for each recipe that is pulled from the recipe database 602, the sub-process checks at 604 for a modifier indication in the ring up data. When not present, the sub-process ends 606. When a modifier is present, the process at 608 pulls the modification from the ring up data 610. In step 610, the modification is applied to the drink recipe at 612. A flag at 614 is created for the matching process to use the modified recipe instead of pulling information from the recipe database and the sub-process ends.

Figure 7:
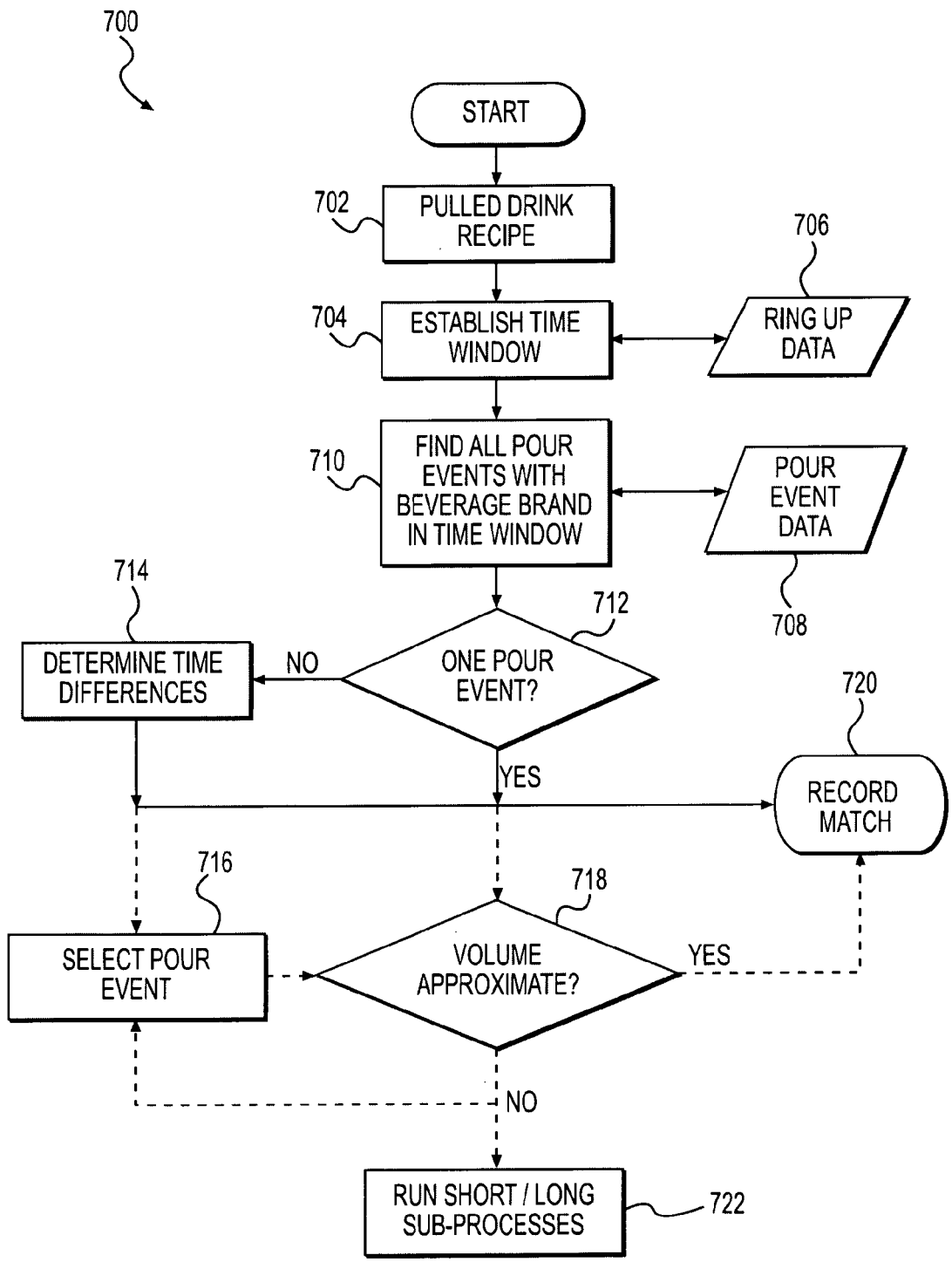
FIG. 7 is a matching process flowchart in accordance with embodiments of the present invention.

FIG. 7 is a matching process 700 according to a non-limiting embodiment of the present invention. The drink recipe from the recipe database as described above in FIGS. 4-6 is pulled at 702 and loaded by the match handler. When multiple drink recipes are selected, the match handler will pull the information for each of the drink recipes. The drink recipe information includes, for example, the number of ingredients and for each ingredient, the beverage brand and associated volume. In some embodiments only ingredients of a particular type, such as alcoholic beverages, may be included in the information pulled with the drink recipe.

A time window is established at 704 based on the time the ring up data 706 was entered in the POS system. The time window refers to a period of time that occurs before and after the time the ring up data was entered. The time window is configurable from 10 seconds to up to about 30 minutes. Also, the time window may be unbalanced, such that the time before and after the ring up is different. One default for match handler is to use a balanced 10-minute window, i.e. 5 minutes before and after the time of the ring up data 706. In some embodiments the match handler optionally creates successively larger time windows when no matches were found. In some embodiments when no match is found, the match handler may run a second process using a different time window. One advantage of using time windows is to limit the data entries that match handler needs to load and process. Time windows take advantage of a general practice that ring up transactions and pour events generally occur in together, even though not always in close succession.

The process obtains all the pour event data 708 by loading the data that has a time of pour that occurred within the established time window 710. Each beverage brand, or rail brand if necessary, is checked by match handler to find a pour event data entry having a corresponding beverage brand. The beverage brands for each pour event data entry are checked in the time window, and the system determines if more than one corresponding beverage brand in the pour event data exists 712. When this occurs, the process at 714 determines the time difference between each of the pour event data entries and the ring up data entry. The smallest time different is selected as the pour event that matches the ring up entry in 716. In one embodiment, the process may end the matching process in 720. Returning to 712, when only one beverage brand is found in the time window, then the process returns a match in 720.

In another embodiment, such as when the pour event data contains a measured or calculated volume, the process may also match volumes. The match settings instructs the process on whether to match volume, if present, along with the beverage brand. In process 718, the system determines if the selected pour event has a volume that closely approximates the volume of the drink recipe, and a match may be indicated in 720. In one embodiment of the present invention, closely approximation refers to a difference in volume that is less than 30%, and preferably less than 15%, provided that the volume difference does not exceed one ounce. When the volumes do not closely approximate each other, the process optionally may check the pour event with the next smallest time difference in 716 or run a subroutine to determine if a short or long pour has occurred 722. This process is repeated for each of the beverage brands in the drink recipe for the selected ring up data entry. In a second embodiment of the present invention for multiple pour event data entries, closely approximation in 718 refers to one of the pour event data entries that is relatively closest in volume when compared to the other pour event data entries. Such embodiments, may consider both the relative difference in time and the relative difference volume to match the pour event data having the lowest total difference. Match settings instruct match handler on how closely approximate volumes are processed.

To summarize the matching of ring up data with pour event data in FIG. 7, the following occurs in one embodiment. Ring up data is matched to a drink recipe. This may be done using the beverage family, beverage brand or drink alias entered at the POS system. The drink recipe specifies the beverage brands and volume. In addition, the time of entering the ring up data at the POS system is included with the ring up data and used to establish a time window. All the pour event data entries within this time window are pulled by the match handler to determine if the beverage brand of the pour event data matches the beverage brand of the drink recipe or ring up data. Also, when a volume is associated with the pour event data and the match settings are to match volumes, the match handler determines if the volume from the pour event data closely approximates the volume from the drink recipe. Thus, such embodiments link the ring up data to the pour event data through information in the recipe database. Such linking advantageously allows the ring up data and pour event data to be obtained independently without requiring the operator to manual link the ring up and pour event for each transaction. This independently obtained data speeds the process of the transaction, because no additional steps are needed when the transaction is made.

The short pour and long pour sub-process may be used when no adequate match using FIG. 7 can be made in 718. These sub-processes may be used when none of the identified pour events have a volume that is closely approximate to the drink recipe. The short pour sub-process is shown in FIG. 8 and the long pour sub-process is shown in FIG. 9.

Figure 8:
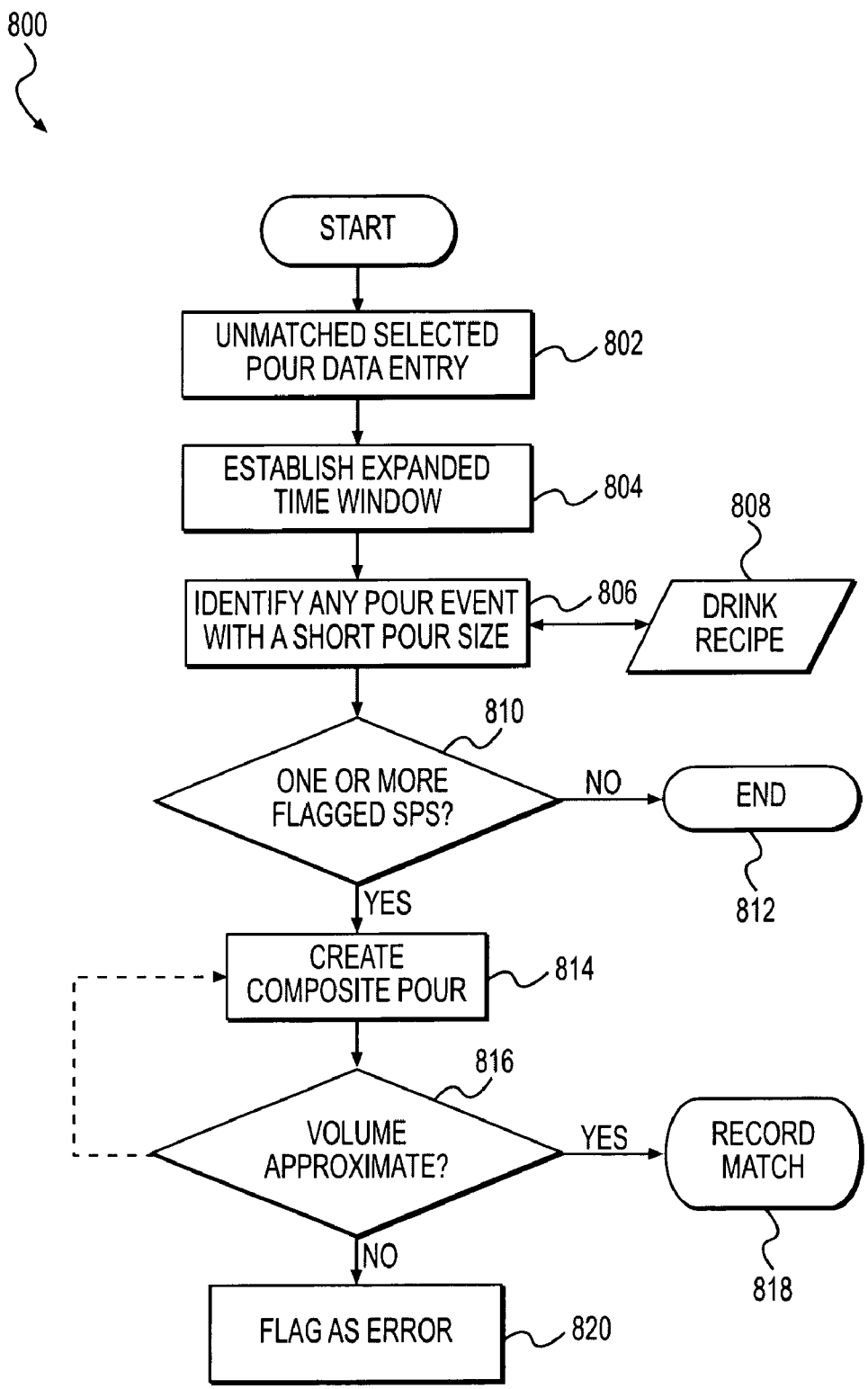
FIG. 8 is a matching sub-process flowchart for short pours in accordance with embodiments of the present invention.
Figure 9:
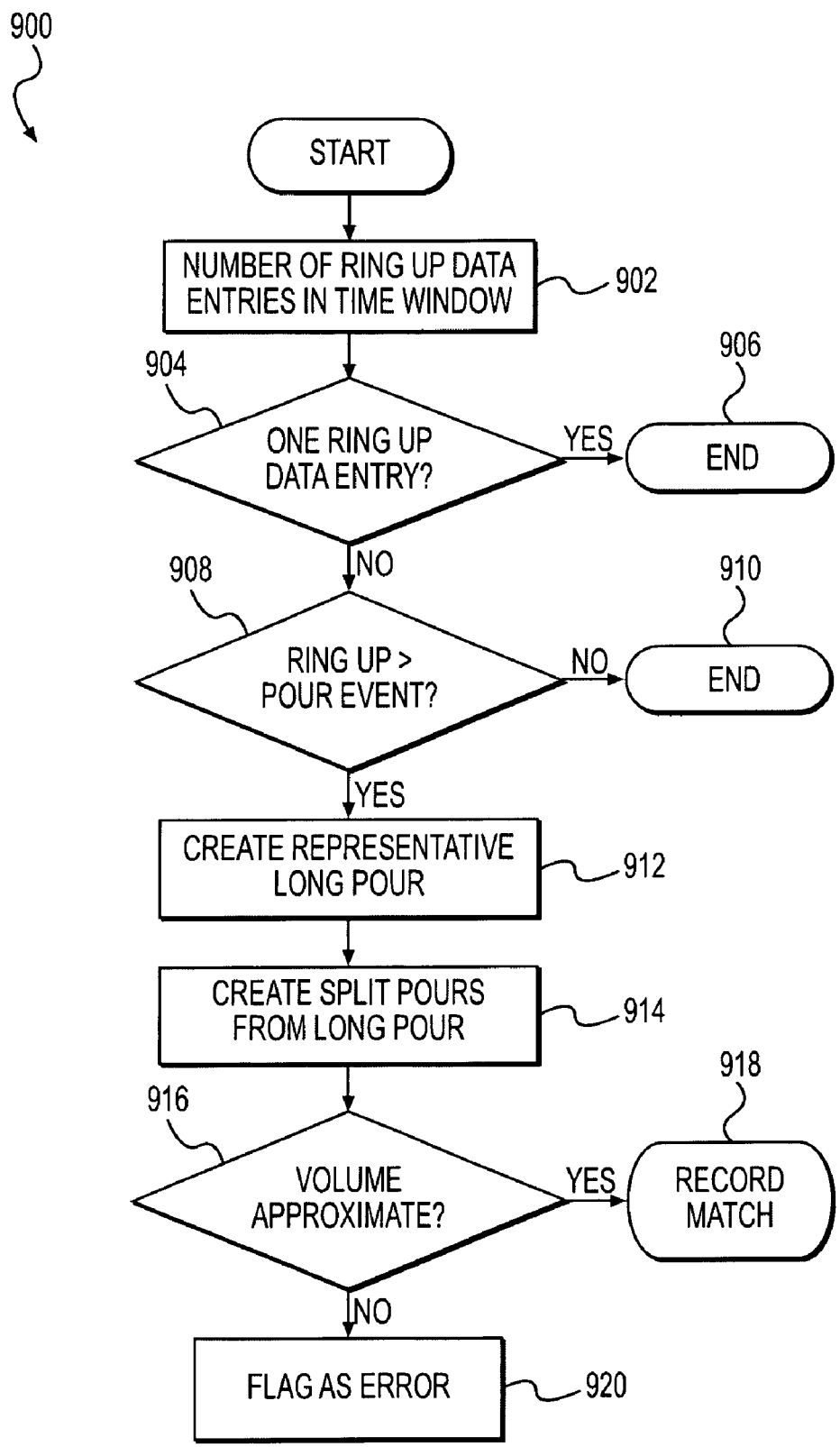
FIG. 9 is a matching sub-process flowchart for long pours in accordance with embodiments of the present invention.

FIG. 8 is a flowchart of the short pour sub-process 800. Short pour sub-process is run for pour event data entries that have less than the volume required by the drink recipe. To begin the short pour sub-process, the selected pour event data entry having the closest approximation in time and volume from FIG. 7 is selected at 802. Next the time window is expanded in 804 by a factor from 1× to 10×, or preferably up to 5×, or preferably up to 3×. In some embodiment the time window is not expanded for the short pour sub-process. Each of the pour event data entries 806 in the expanded time window having a short pour size (SPS) is flagged as a short pour in step 808. SPS is defined for each beverage brand in the drink recipe. The SPS for a drink recipe that uses an ingredient having 1 ounce size may be, for example, 0.3 ounces. Generally, SPS is defaulted at 0.25 ounces for all drink recipes, but may be configured by the operator. Also, SPS may have a lower limit to disregard small pours that indicate a non-pour or error data. The lower limit is configurable and defaults to 0.05 ounces. The selected pour event data entry may be a short pour.

In some embodiments, any pour event data entry within the expanded time window, regardless of beverage brand, having a SPS may be flagged as a short pour. This allows, the flagging of all short pours at once which may save processing time when matching other ring up data entries.

In 810, when there are no flagged short pours, the sub-process ends at 812. However, when there is more than one short pour flagged, the sub-process determines which short pour(s) should be combined. The short pours may be combined with the selected pour event data entry or other pour event data entries, based on a similarity of beverage brand. In 814, the process identifies the short pour having the smallest time difference with a similar beverage brand for a selected pour event data entry. The short pour and the selected pour event data entry are combined into a composite pour that combines the volume for the similar beverage brands. For short pours that are combined with the selected pour, the volume of the composite pour is checked in 816 to determine if there is a close approximation with the volume from the drink recipe and record the match 818. If not, the sub-process optionally creates a composite pour with the next short pour flagged have the similar beverage brand, if present, with the next smallest time difference. This continues until a composite pour may be formed. If no composite pour is formed, the selected pour event data entry is flagged as a potential error 820. The flagged selected pour event data entry may be later reviewed during an auditing process. For shorts that are combined with other pour event data entries, the volume may be checked when matching that composite pour with a different ring up data entry.

FIG. 9 is a flowchart of the long pour sub-process 900 from FIG. 7. A long-pour sub-process may be run when the volume of the pour entry data exceeds the volume of the drink recipe. Also, prior to the long-pour sub-process, a short-pour process as described in FIG. 8 may be run to resolve any potential short pours. When a pour event data entry exceeds the volume of the drink recipe, the sub-process determines the number of ring up data entries having the same beverage brand made in the time window 902. The time window may be based on the selected ring up data entry or a combination of ring up data entries within the time window of the selected ring up data entry. When the number of ring up data entries is one or less in 904, the sub-process ends and the pour event data entry is flagged to match the one ring up data entry in 906. Although the volume of the pour event data entry does not closely approximate drink recipe, the two entries are matched and indicated as a potential error.

When the number of ring up data entries having the same beverage brands exceeds one, then the sub-process identifies the number of ring up data entries in 908. When, the number of pour event data entries is the same as the number of ring up data entries, then long pour sub-process ends 910. When the total number of ring up data entries exceeds the number of pour event data entries in 908, the total volume of the pour event data entries is combined a representative long pour in 912. One or more additional split pours are created from the representative long pour by dividing the total volume with the number of ring up data entries in 914. The split pours each have the same volume. The number of split pours equal the number of ring up data entries that have the same beverage brand. Next, the sub-process determines if each of the split pours closely approximates the volume of the each of the ring up data entries in 916. When any of the split pours closely approximates the volume of any of the ring up data entries, then a match is made and recorded in 918. If any of the split pours do not closely approximate the volume of any of the ring up data entries, then the split pours and ring up data entries are flagged as an error 920.

FIGS. 10A1, 10A2, 10B1, 10B2, 10C1, and 10C2 is a flowchart of a POS matching embodiment of the present invention. In step 5000, a POS reconciliation timer fires. In step 5002, POS system is checked for new ring-ups. In step 5004, it is determined whether there are any ring-ups. If there are no ring-ups, in step 5006, the database is checked for the existence of new dispensing events, also called pours. In step 5008, a determination is made of whether there are new pours. If there are no new pours, then step 5000 is repeated.

If, in step 5008, there is a pour, then, in step 5010, a determination is made as to whether the pour falls within the time to match window. The time to match window is a period of time before or after the pour in which the drink should be rung up. The time window is user configurable. If the time period has not expired, then the pour falls within the time to match window and step 5000 is repeated. If, in step 5010, the pour does not fall within the time to match window, i.e., the time period in which the drink should have been rung up has expired, then, in step 5012, the pour is flagged or marked as "unrung." In step 5014, it is determined whether the work shift has ended. If the work shift has not ended, step 5000 is repeated. If the work shift has ended, then, in step 5016, all pours that were not matched are flagged, and step 5000 is repeated.

If, in step 5004, ring-ups exist, then, in step 5018, it is determined whether there is a price look-up number (PLU) in personal computer's database. If there is no PLU in the database, then, in step 5019, the POS ring-up data is discarded and posted to the exceptions report.

If, in step 5018, a PLU does exist in the database, then, in step 5020, the drink recipe associated with that PLU is obtained from the database. In step 5022, it is determined whether all the ingredients in the drink recipe have been matched. If all ingredients have been matched, then step 5000 is repeated. If, in step 5022, all ingredients have not been matched, then, in step 5024, it is determined whether there are any unmatched pours in the database. If, in step 5024, there are unmatched pours in the database, then processing continues with step 5032 as shown in FIGS. 10B1 and 10B2.

In step 5032, it is determined whether the current pour is of the same brand as the ring-up. If, in step 5032, the current pour is of the same brand as the ring-up, then, in step 5034, it is determined whether the current pour falls within match proximity. Match proximity exists if the time allowed for a drink to be rung up has not expired. In other words, after a pour, there is a set period of time in which the serving person must ring up the drink in POS system. If no ring-up is entered within the set period of time, then a page is sent to serving persons to alert them that a drink has been poured that has not been rung up. If the time period has not expired, then the pour falls under match proximity, and, in step 5036, it is determined whether the pour was a pour of wine or a pour of liquor. This information is contained in the database.

If, in step 5036, a wine pour has occurred, then, in step 5038, it is determined whether the volume poured calls for a top-off matching. If the volume of wine poured is less, by a particular configurable amount, than the volume of a full glass of wine, then an additional amount, which is also configurable, of wine from a new bottle was assumed to have been poured to top off the glass. In this case, in step 5040, data from the next succeeding wine pour must be obtained. In step 5042, it is determined whether a successive or next wine pour exists. If a next wine pour exists, and, if the volume of that pour is less than a particular configurable amount, then, in step 5044, it is determined whether the time between the current wine pour and the next wine pour falls within the wine top-off pour match proximity. This is a pre-set time period within which a glass of wine may be topped off with wine from a new bottle. If, in step 5044, the time between the current wine pour and the next wine pour is within this period, then, in step 5046, the next wine pour is flagged as a dispensing event that has already been processed and is merged with the current wine pour and together, matched to the ring-up.

If, in step 5044, the time period between the current wine pour and the next wine pour is outside the allowed wine top-off pour match proximity, then processing continues with step 5056 as shown in FIGS. 10C1 and 10C2. In step 5056, the current pour is matched to the POS ring-up. In step 5058, it is determined whether the pour that is being matched was flagged as unrung. If the pour was not flagged as unrung, then processing continues with step 5020 in FIGS. 10A1 and 10A2. If, in step 5058, this pour was flagged as unrung, then, in step 5060, the pour is marked as a match and deleted from the unrung pours screen and the exceptions report. Processing then continues with step 5020 in FIGS. 10A1 and 10A2.

If, in step 5042, no next wine pour is located, then processing continues with step 5056.

If, in step 5038, the volume of wine poured does not call for a top-off matching, meaning that a full glass of wine was poured, then processing continues with step 5056 on FIGS. 10C1 and 10C2.

If, in step 5036, the dispensing event or pour is a liquor pour, then, in step 5048, it is determined whether this is the first pour from a bottle with a newly assigned sensor device. If it is not the first pour, then processing continues with step 5056 on FIGS. 10C1 and 10C2.

If, in step 5048, the current pour is the first pour from a bottle with a newly assigned sensor device, then, in step 5050, data from the last pour of the same brand of beverage is obtained from the database. In step 5052, a determination is made as to whether the current pour and the last pour from a bottle of the same brand fall within the liquor top-off match proximity. In other words, if the time period for topping off a glass of liquor has not expired, then the current pour and the last pour fall within the liquor top-off match proximity, and, in step 5054, the current pour is flagged as already matched. Processing then continues with step 5020 on FIGS. 10A1 and 10A2. If, in step 5052, the current pour and the last pour from a bottle of the same brand do not fall within the liquor top-off match proximity, meaning that the time period for topping off a glass of liquor has expired, then processing continues with step 5020 in FIGS. 10A1 and 10A2.

If, in step 5034, the current pour does not fall within match proximity, then, in step 5035, the serving person is paged. In step 5062, shown in FIGS. 10C1 and 10C2, a determination is made as to whether the current pour still falls within the time to match. If the pour falls within the time to match, then the time period has not expired, and processing continues with step 5020 in FIGS. 10A1 and 10A2.

If, in step 5062, the pour does not fall within the time to match, then the time period has expired, and, in step 5064, the pour data is added to an exceptions report. In step 5065, the pour is marked unrung. Processing continues with step 5020 in FIGS. 10A1 and 10A2.

If, in step 5032, the current pour is not of the same brand as the ring-up, then, in step 5066, shown in FIGS. 10C1 and 10C2, it is determined whether the "end of shift" matching has been triggered. Triggers for end of shift matching include an end of shift or a period of time in which POS system and/or personal computer has been idle for a configurable period of time. If an end of shift match trigger has not occurred, then processing continues with step 5062. If, in step 5066, an end of shift match trigger has occurred, then, in step 5068, pours of any brand of liquor having a cost within a particular configurable range of the cost of the brand called for in the drink recipe, will be sought. In step 5070, it is determined whether a pour of similar cost exists. If a pour of cost within the set range is located, then, processing continues with step 5056. If, in step 5070, no pour of cost within the set range is located, then, in step 5072, the pour will be flagged as processed but unmatched. Processing will then continue with step 5020 in FIGS. 10A1 and 10A2.

If, in step 5024, there are no unmatched pours in the database, then, in step 5026, it is determined whether this drink recipe calls for a small pour ingredient. A small pour ingredient is an ingredient of which a small amount is called for in a drink recipe, such as a splash of a particular beverage. The pour of such an ingredient might not be treated as a valid pour by sensor device and might have been discarded. Thus, in order to account for this ingredient, if, in step 5026, a small pour ingredient is called for by the drink recipe, then, in step 5028, it is determined whether the time required before a pour is automatically created has elapsed. This time is a user configurable period of time, after which system will automatically create a pour for the small ingredient. Thus, if, in step 5028, the time has elapsed, then, in step 5030, a pour for the small ingredient is automatically created. Processing then continues with step 5020. If, in step 5028, the time has not elapsed, then step 5000 is repeated.

If, in step 5026, the particular drink recipe did not call for a small pour ingredient, then step 5020 is repeated.

Such processes of the present invention may be performed using a human application service provider (HASP) which responds to commands from a user. A HASP allows direct supervision of activities in an establishment on an ad hoc basis. The HASP provides a useful supervising tool to monitoring the behavior of bartenders. Alternatively, such processes of the present invention may use an automated matching service (AMS) which performs the process matching on a schedule. The AMS may have a schedule to perform the process at regular intervals, such as every 1, 2, 3, 5 or 10 minutes or at the end of an hour or day. The schedule may be user-adjusted, but once set the AMS handles the remaining match processes. HASP or AMS may be implemented as software or in a computer. For the purposes of the present application HASP or AMS may be referred to as the system implementing a process of the embodiments of the present invention.

The software embodiments of the present invention may include an inventory management system for determining the actual cost of goods depleted based on the inventory value depleted and the POS ring up values. The inventory management system may be at a remote location from the establishment. The inventory management system may generate a purchase order based on the estimated usage relative to the POS ring ups and the monitored depletions.

In tracking the usage history, the system may also notify management of any discrepancies that may lead to waste and/or pilferage. Typically, this may result when the system tracks that a liquid has been dispensed using the pour event data but does not locate a corresponding ring up data or payment. This may trigger an alert condition. When a user attempts to dispense without the proper dispensing information or destination information, an alert condition, such as a light or sound will indicate an invalid dispensed serving. A pager that the manager wears may also beep when an invalid serving is attempted or dispensed. The alert condition may be sent a message to a phone or e-mail address. An alert condition may end when a user or another authorized person collects the outstanding payment to satisfy the bill error that started the alert condition. A preferred alert condition is described in co-pending U.S. application Ser. No. 09/964,679, entitled "Beverage Dispensing Control System," filed Sep. 28, 2001, and U.S. Pat. No. 6,504,481, the entire contents and disclosure of which are hereby incorporated by reference.

In an embodiment of the present invention a telephone inventory management system may also be used. The telephone inventory management system may use voice recognition to record changes in the inventory. A manager may record the inventory when receiving it or when performing an audit. The telephone may allow the manager to use a cell phone to send the data without the need for a separate piece of electronic equipment. The system may compare the inventory received from the telephone system with the POS information. This may help identify waste/pilferage.

The inventory monitoring system of the present invention can also provide real time feedback to the operators. This feedback may come from business intelligence software linked to the inventory database. In one embodiment, the business intelligence software is remote to a plurality of establishments and analyzes the inventory databases associated with each establishment. The business intelligence software may provide recommendations to the operator to sell more of a given beverage brand. For example, the inventory database may indicate that beverage brand X has a high inventory. Beverage brand X may be used a rail brand. The business intelligence software may provide the operator with a recommendation to use beverage brand X for all drink recipes having a rail brand indicator in response to the high inventory. Also, the recommendations may based in combination with environmentally scrapped data. Scrapped data is information of the environment when transactions or pour events are made. This includes information on the outside weather, inside temperature, news events, sporting events, or holidays. The scrapped data may be associated with the ring up and pour event data to find commonalities and trends that may be useful in predicting future sales. The business intelligence software may be used to promote a contest between bartenders. The contest may involve bartenders from several establishments, and ranks the bartenders in terms of sales based on particular beverage brands. The business intelligence software also provides real time feedback to supervisors, such "running low of brand X, get another bottle opened" or "running low of brand X, order more."

Embodiments of the present invention may also calculate employee performance statistics by dividing the profit of an employee by the volume of drinks poured. The volume to profit ratio (VPR) provides a useful tool for the industry to measure performance. Also the ratio could be further refined to calculate the number of drinks sold per liter.

Embodiments of the present invention may be used to monitor potential alcohol abuse and alert the operator. Systems may track using the ring up data from the POS system, how much alcohol a customer has consumed. In the POS system, the bartender associates each ring up as made by the bartender by entering the information or scanning a card or code. Also, when entering the ring up the bartender enters the customer information of where the drink is served, i.e. table number and seat position or the bar stool or bar position of the customer. Using a database of alcohol content for each brand, the system can determine how much one person has consumed within a given time period. When an alcohol impairment level has been reached, i.e. too much alcohol has been served, the bartender or manager is warned. The alcohol impairment level may have two levels, such as to indicate when a customer would be over the legal limit for driving while impaired/intoxicated, and over the legal limit for driving under the influence.

In some embodiments of the present invention software may link of the serving of alcoholic beverages to customers and designated drivers so as to reduce drunken driving. The system integrates with many establishments throughout an area, such as city or county, so the customer's drinking can be tracked throughout the night.

All documents, patents, journal articles and other materials cited in the present application are hereby incorporated by reference.

Although the present invention has been fully described in conjunction with the preferred embodiment thereof with reference to the accompanying drawings, it is to be understood that various changes and modifications may be apparent to those skilled in the art. Such changes and modifications are to be understood as included within the scope of the present invention as defined by the appended claims, unless they depart therefrom.

EXAMPLES

The present invention will now be described by way the following examples that show information that would be displayed by a match handler in accordance with exemplary embodiments of the present invention.

Example 1

The match handler software displays on a screen the information shown in FIG. 11. In this example, the transaction recorded at the POS system indicates the beverage family/brand. There are three different sections: Ring up data entries; Pour event data entries in time window; and Match process information. The ring up data entries include time of transaction at the POS system, identification of operator (Bart. ID), identification of POS system (POS ID), and beverage family/brand. The pour event data entries in time window includes each of the pour event data entries identified by time sensor detect tilt of container, identification of operator (Bart. ID), calculated volume in ounces (Vol.) based on tilt, and beverage family/brand. Match process information has two sections, one for displaying the status and one for displaying the match results. The match results indicate the drink recipes as well as the ingredients for the selected drink recipe.

In FIG. 11, the automated system selects the Grey Goose entry made at 09:45:57 at POS terminal 2 by bartender 10. A time window is established based on the time of 5 minutes before and after. Each of the pour event data entries that fall within the time window are displayed. Next, the system identifies one or more drink recipes that use Grey Goose as a beverage brand. The volume indicated by each recipe is checked against the calculated amount from the pour event data entry. Once the volume that closely approximates, i.e. within 30% of the calculated volume, the match handler indicates the selected drink recipe. In FIG. 11, no sub-processes were run to handle rail brands, modifications, short pours or long pours. The system only identified one pour event data entry within the time window and indicates "status" as "match is found."

Even though the pour event data indicates a volume that exceeds the amount in the drink recipe, the system records the match and updates the real time inventory. Thus, an operator would have updated inventory database with the actual amounts instead of relying on the drink recipe. In such an example, when only using the volume of the ring up data or drink recipe, the establishment would not realize the shortfall in the inventory or the extent of the overage/pilferage.

Example 2

The match handler software has a similar display as example 1, except that the BART. ID has been filtered out of both the ring up data entries and pour event data entries in FIG. 12. For the selected Schapple Barrel entry made at 08:23:11 there is no corresponding pour event data entry within a time window of 10 minutes before and after the ring up data entry. No recipes are identified and the error status is flagged as "Match not found."

Example 3

Similar to the match handler software display of example 2, the automated process selects Southern Comfort entry made at 03:23:44 in FIG. 13 Using a five-minute time window several pour event data entries are identified. A match between the beverage family/brand from the ring up data and drink recipe is found. The associated volume from the drink recipe closely approximates, i.e. less than 5%, the calculated volume in the only pour event data entry having the same brand. A match is indicated.

Also, in the time window, two short pours are identified; 0.25 ounces of Johnnie Walker at 03:25:24 and 0.25 ounces of Bacardi 151 Rum at 03:21:29. Even though the system is matching Southern Comfort, these short pours can be handled during the matching of Southern Comfort. First, the short pour Johnnie Walker is flagged and joined to the closest other Johnnie Walker pour event data entry in the time window. Note that there are two other Johnnie Walker pour event data entries, but the closest one to join was made at 03:26:37. The system creates a composite pour by adding the volume of the entry made at 03:25:24 to the entry made at 03:26:37. The entry made at 03:25:24 is removed from the pour event data entries. In addition, the Bacardi 151 Rum is also flagged as a short pour. However, there are no other pour event entries of the same brand in the time window. The system does not create a composite pour, but the system flags that entry to create a composite pour when matching of other ring up data entries.

Example 4

Similar to the match handler software display of example 2, the automated process selects Malibu entry made at 03:23:44 in FIG. 14. In the 5-minute time window, one pour event data entry having the same beverage brand is found at 03:24:41. However, when checking the calculated volume against the volume of the recipe database, the system notes that the volume is exceeded by 100%. The system checks the number of ring ups entries within the 5-minute time window and identifies that one other ring up entry of Malibu exists. The system creates a representative long pour and splits the volume by the number of entries in the ring up database. The number of split pours equal the number of ring up entries.

Long pour process is performed by match handler when the number of ring up data entries exceeds the number of pour event data entries. When checking the Johnnie Walker pour event at 03:26:37, the system will not find another pour in the time window with the same beverage brand. Thus, the Johnnie Walker pour event is flagged as an error for an over pour rather than a long pour to be split.

What is claimed is:

1. A method for monitoring beverage dispensing from a container comprising:
receiving ring up data for a transaction entered into a point-of-sale device, the ring up data comprises a drink alias;
looking up the drink alias in a recipe database to determine one or more beverage brands for the ring up data; and
matching the ring up data with at least one of a plurality of pour event data entries received from a tilt sensor attached to the container, each of the pour event data entries comprises a beverage brand, using at least one of the one or more determined beverage brands, wherein said tilt sensor is not in direct contact with the beverage in said container.

2. The method of claim 1, further comprising establishing a time window based on the ring up data and including in the time window a selected group of the plurality of pour event data entries.

3. The method of claim 2, wherein the ring up data is matched to the at least one of the plurality of pour event data entries in the selected group.

4. The method of claim 1, further comprising:
determining an associated volume for each of the one or more beverage brands from the recipe database using the ring up data; and
matching the ring up data with at least one of a plurality of pour event data entries using the associated volume.

5. The method of claim 4, wherein the at least one of a plurality of pour event data entries has a volume that closely approximates the associated volume of the drink recipe.

6. The method of claim 1, further comprising obtaining each of the plurality of pour event data entries using a sensor attached to the container from which the beverage is dispensed, wherein the sensor is attached to the container's neck but does not obstruct the flow of the beverage.

7. The method of claim 1, further comprising receiving each of the plurality of pour event data entries after the beverage is dispensed.

8. The method of claim 1, further comprising matching the ring up data to a number of the plurality of pour event data entries, wherein the number corresponds to the one or more beverage brands from the selected drink recipe.

9. The method of claim 1, wherein the ring up data is matched to a composite pour, the composite pour comprising two or more pour event data entries, wherein one of the two or more pour event data entries has a volume that is less than a short pour size.

10. A method for monitoring beverage dispensing from a container comprising:
   identifying two or more pour event data entries received from a tilt sensor attached to the container and the tilt sensor not in direct contact with the beverage in said container, the two or more pour event data entries
   (i) each have a same beverage brand;
   (ii) each occur within a time window based on a first ring up data entry; and
   (iii) where one of the two or more pour event data entries has a volume that is less than a short pour size, wherein the short pour size has a volume set by a drink recipe;
   creating a composite pour by adding the volumes of the two or more identified pour event data entries; and
   matching the composite pour with a second ring up data entry.

11. The method of claim 10, wherein the first ring up data entry and the second ring up data entry are associated with different beverage brands.

12. The method of claim 10, wherein the matching of the composite pour further comprises:
   determining one or more beverage brands and associated volume for each of the one or more beverage brands from a selected drink recipe using the second ring up data; and
   matching the second ring up data with the composite pour using the determined one or more beverage brands and the associated volume.

13. The method of claim 12, wherein the composite pour has a volume that closely approximates the associated volume of the selected drink recipe.

14. The method of claim 10, wherein each of the two or more pour event data entries is obtained independently of the first ring up data entry and the second ring up data entry.

15. A method of monitoring beverage dispensing from a container comprising:
   receiving a number of pour event data entries, each pour event data entry being received from a tilt sensor attached to the container and the tilt sensor not in direct contact with the beverage in said container from a tilt sensor;
   determining for a selected time window that a number of ring up data entries that is greater than the number of pour event data entries, wherein the ring up data entries and pour event data entries have a same beverage brand;
   combining volumes of all of the pour event data entries in the time window having the same beverage brand;
   creating two or more split pours by dividing the combined volume based on the number of ring up data entries, wherein each of the two or more split pours have a same volume and the same beverage brand; and
   matching each of the two or more split pours to each of the ring up data entries.

16. The method of claim 15, further comprising determining one or more beverage brands and associated volume amount for each of the one or more beverage brands from a selected drink recipe using one of the two or more ring up data entries.

17. The method of claim 16, wherein the volume of all of the pour event data entries are combined when one of the pour event data entries has a volume that exceeds the associated volume.

18. The method of claim 15, wherein each of the pour event data entries is obtained independently of the two or more ring up data entries.

19. The method of claim 15, wherein the number of the two or more split pours equals the number of the two or more ring up data entries.

* * * * *